(12) United States Patent
Kuromatsu et al.

(10) Patent No.: US 9,535,743 B2
(45) Date of Patent: Jan. 3, 2017

(54) DATA PROCESSING CONTROL METHOD, COMPUTER-READABLE RECORDING MEDIUM, AND DATA PROCESSING CONTROL DEVICE FOR PERFORMING A MAPREDUCE PROCESS

(71) Applicant: FUJITSU LIMITED, Kawasaki-shi, Kanagawa (JP)

(72) Inventors: Nobuyuki Kuromatsu, Kawasaki (JP); Yuichi Matsuda, Yokohama (JP); Haruyasu Ueda, Ichikawa (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/790,368

(22) Filed: Jul. 2, 2015

(65) Prior Publication Data
US 2016/0019090 A1 Jan. 21, 2016

(30) Foreign Application Priority Data

Jul. 18, 2014 (JP) ................................. 2014-148139

(51) Int. Cl.
*G06F 9/46* (2006.01)
*G06F 9/50* (2006.01)

(52) U.S. Cl.
CPC ............... *G06F 9/46* (2013.01); *G06F 9/5038* (2013.01); *G06F 9/5072* (2013.01)

(58) Field of Classification Search
CPC .................................. G06F 9/46; G06F 9/4806
USPC ........................................................ 718/102
See application file for complete search history.

(56) References Cited

U.S. PATENT DOCUMENTS

| 8,635,402 | B2 | 1/2014 | Torii | |
| 8,819,335 | B1* | 8/2014 | Salessi | G06F 12/0246 711/103 |
| 2013/0291118 | A1* | 10/2013 | Li | G06F 21/60 726/26 |
| 2013/0326535 | A1* | 12/2013 | Matsuda | G06F 9/50 718/104 |
| 2013/0339966 | A1* | 12/2013 | Meng | G06F 9/5061 718/102 |
| 2014/0067992 | A1* | 3/2014 | Saeki | H04L 29/08549 709/214 |
| 2014/0082180 | A1* | 3/2014 | Mutoh | H04L 47/40 709/224 |
| 2014/0101213 | A1* | 4/2014 | Ueda | G06F 17/30076 707/827 |

(Continued)

FOREIGN PATENT DOCUMENTS

| JP | 2012-190078 | 10/2012 |
| JP | 2013-235515 | 11/2013 |
| WO | WO 2010/114006 | 10/2010 |

*Primary Examiner* — Qing Chen
(74) *Attorney, Agent, or Firm* — Staas & Halsey LLP

(57) ABSTRACT

A data processing control device performs a MapReduce process. When the data processing control device assigns input data to first Reduce tasks and a second Reduce task performed by using a result of Map processes, the data processing control device assigns input data with smaller amount than any of amounts of the input data which is assigned to the first Reduce tasks to the second Reduce task. The data processing control device assigns the first Reduce tasks and the second Reduce task, to which input data is assigned, to a server that performs Reduce processes in the MapReduce process such that the second Reduce task is started after the assignment of all of the first Reduce tasks.

6 Claims, 18 Drawing Sheets

(56) References Cited

U.S. PATENT DOCUMENTS

| | | | |
|---|---|---|---|
| 2014/0115282 A1* | 4/2014 | Natkovich | G06F 12/16 711/162 |
| 2014/0181831 A1* | 6/2014 | Le Scouarnec | G06F 9/5027 718/104 |
| 2014/0201753 A1* | 7/2014 | He | G06F 9/5066 718/104 |
| 2014/0215477 A1* | 7/2014 | Chen | G06F 9/5066 718/102 |
| 2014/0372611 A1* | 12/2014 | Matsuda | H04L 45/12 709/225 |

* cited by examiner

| MAIN KEY | NUMBER OF APPEARANCES |
|---|---|
| BANK A | 100 |
| BANK B | 80 |
| BANK C | 60 |
| BANK D | 30 |
| BANK E | 20 |

| REDUCE ID | KEY TO BE PROCESSED | TOTAL NUMBER OF APPEARANCES |
|---|---|---|
| 0 | BANK A | 100 |
| 1 | BANK B | 80 |
| 2 | BANK C | 60 |
| 3 | BANK D+BANK E | 50 |

| JobID | TOTAL NUMBER OF MAP TASKS | TOTAL NUMBER OF REDUCE TASKS | NUMBER OF SPARE REDUCE TASKS |
|---|---|---|---|
| 001 | 6 | 5 | 1 |
| 002 | 4 | 2 | 1 |

FIG.11

| JobID | TaskID | TYPE | SLAVE ID OF SLAVE THAT INCLUDES THEREIN DATA | STATE | ASSIGNMENT SLAVE ID | NUMBER OF NEEDED SLOTS |
|---|---|---|---|---|---|---|
| Job001 | 000 | Map | Node1, Node2 | Done | Node1 | 1 |
| Job001 | 001 | Map | Node3, Node4 | Done | Node2 | 1 |
| Job001 | 002 | Map | Node1, Node3 | Running | Node3 | 1 |
| Job001 | 003 | Map | Node2, Node4 | Running | Node4 | 1 |
| Job001 | 1 | Reduce | - | Not assigned | | 1 |
| Job001 | 2 | Reduce | - | Not assigned | | 1 |
| Job001 | 3 | Reduce | - | Not assigned | | 1 |
| Job001 | 4 | Reduce | - | Not assigned | | 1 |
| ... | ... | ... | ... | ... | ... | ... |

FIG.13

| REDUCE ID | KEY TO BE PROCESSED |
|---|---|
| 0 | BANK A |
| 1 | BANK B |
| 2 | BANK C |
| 3 | BANK D+BANK E |
| 4 | BANK F |

DATA PROCESSING CONTROL METHOD, COMPUTER-READABLE RECORDING MEDIUM, AND DATA PROCESSING CONTROL DEVICE FOR PERFORMING A MAPREDUCE PROCESS

CROSS-REFERENCE TO RELATED APPLICATION

This application is based upon and claims the benefit of priority of the prior Japanese Patent Application No. 2014-148139, filed on Jul. 18, 2014, the entire contents of which are incorporated herein by reference.

FIELD

The embodiments discussed herein are related to a data processing control method, a computer-readable recording medium, and a data processing control device.

BACKGROUND

With the popularization of cloud computing, distributed processing systems are used that execute processes, in a distributed manner, on mass data stored in a cloud system by using a plurality of servers. Hadoop (registered trademark) that uses, as the fundamental technology, the Hadoop Distributed File System (HDFS) and MapReduce processes are known as the distributed processing system.

HDFS is a file system that stores data in a plurality of servers in a distributed manner. MapReduce is a mechanism that performs the distributed processing on data in HDFS in units of tasks and that executes Map processes, Shuffle sort processes, and Reduce processes.

In the distributed processing performed by using MapReduce, tasks related to the Map processes or the Reduce processes are assigned to a plurality of slave nodes and then the processes are performed in each of the slave nodes in a distributed manner. For example, a master server assigns tasks related to Map processes to the plurality of slave nodes and each of the slave nodes performs the assigned Map task. Patitioner performed in each of the slave node calculates, in a Map task, a hash value of a key and decides, on the basis of the value obtained by the calculation, a Reduce task that is performed at the distribution destination.

In this way, the assignment of Reduce tasks to the slave nodes is equally performed by using a hash function or the like; however, the throughput of each of the Reduce tasks is not always equal due to an amount of data targeted for the Reduce operation associated with a key or the like that is associated with a Reduce task.

For example, even if distribution keys are equally distributed to each of the slave nodes, the throughput differs for each Reduce task. Namely, a unit of process performed in a Reduce task, i.e., the processing time, differs among Reduce slots and thus overall processing time may possibly be extended. In this way, because completion time of the process in each of the slave nodes differs, the completion of the overall job constituted by several tasks depends on the completion of the process performed by a slave node whose performance is the lowest.

Because of this, as a technology that adjusts Reduce tasks to be assigned to each slave node, for example, there is a known technology that investigates the number of appearances of a key by sampling input data and that previously assigns Reduce tasks that have different throughput.

Patent Document 1: Japanese Laid-open Patent Publication No. 2012-190078
Patent Document 2: International Publication Pamphlet No. WO 2010/114006
Japanese Laid-open Patent Publication No. 2013-235515

However, even if the number of appearances of a key has already known by using the sampling or the like and the previously assignment of the Reduce tasks is appropriately performed, there may be a case in which the processing time taken when data associated with keys is processed in the Reduce tasks differs due to various factors. In this case, the processing time differs among the Reduce slots and thus the overall processing time is extended.

Furthermore, to reduce the investigation time of input data, if the number of appearances of a key is estimated by using sampling or past data, the processing time is extended due to a lack of balance caused by estimation or due to handling of a key that is not included at the time of estimation.

SUMMARY

According to an aspect of an embodiment, a data processing control method includes first assigning, when assigning input data to first Reduce tasks and a second Reduce task that are performed by using a result of Map processes in a MapReduce process, input data with smaller amount than any of amounts of the input data which is assigned to the first Reduce tasks to the second Reduce task; and second assigning the first Reduce tasks and the second Reduce task, to which the input data is assigned, to a server that performs Reduce processes in the MapReduce process such that the second Reduce task is started after the assignment of each of the first Reduce tasks.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 11 is a schematic diagram illustrating an example of information stored in a task list DB;

FIG. 13 is a schematic diagram illustrating an example of information stored in an assignment defining table;

DESCRIPTION OF EMBODIMENTS

Preferred embodiments of the present invention will be explained with reference to accompanying drawings. The present invention is not limited to the embodiments. The embodiments can be appropriately used in combination as long as processes do not conflict with each other.

[a] First Embodiment

Overall configuration

Figure 1:
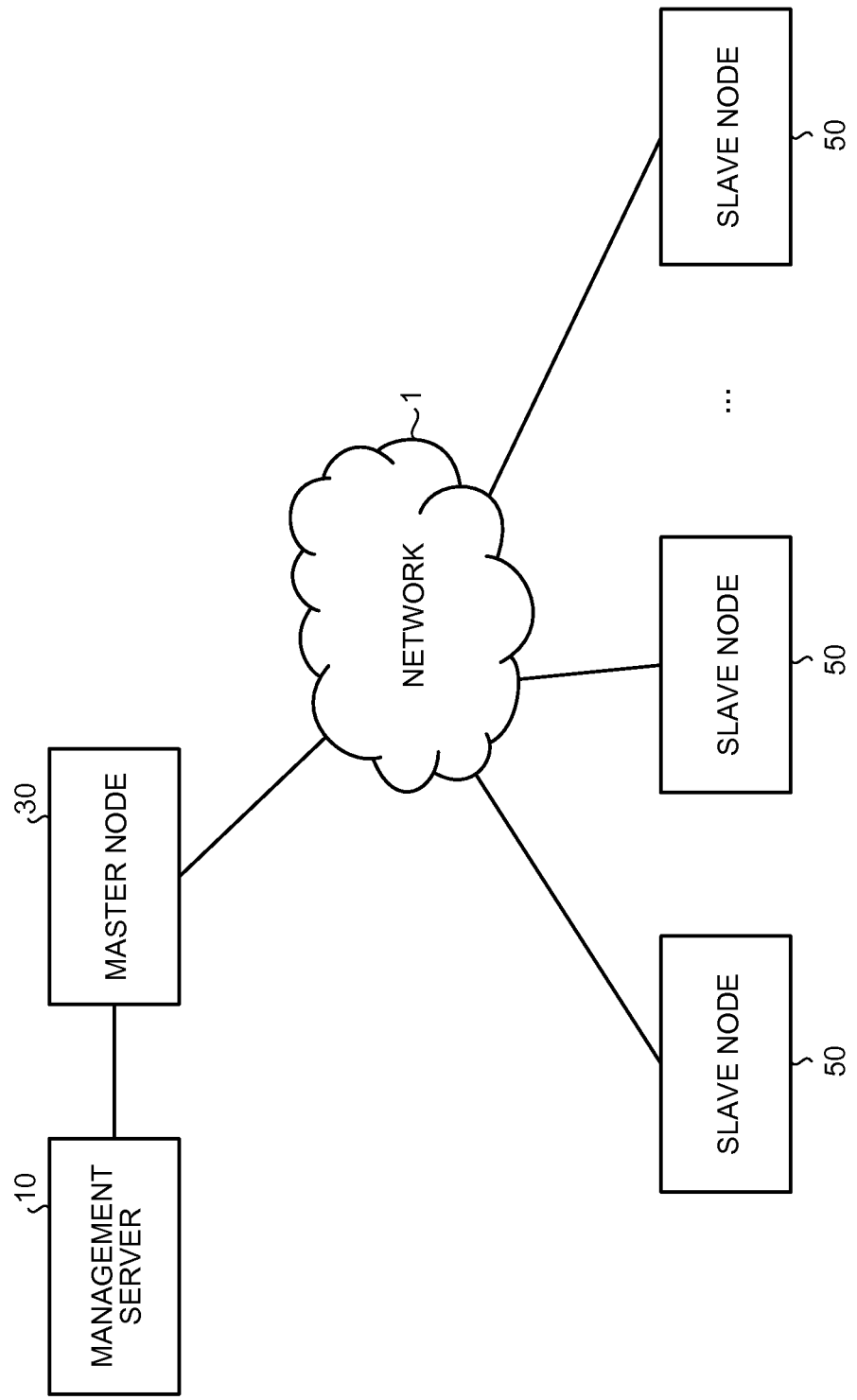
FIG. 1 is a schematic diagram illustrating an example of the overall configuration of a distributed processing system according to a first embodiment.

FIG. 1 is a schematic diagram illustrating an example of the overall configuration of a distributed processing system according to a first embodiment. As illustrated in FIG. 1, in this distributed processing system, a master node 30 and a plurality of slave nodes 50 are connected via a network 1 such that they can communicate with each other.

In this distributed processing system, a distributed processing application that uses a distributed processing framework, such as Hadoop (registered trademark), is performed in each server and, furthermore, HDFS or the like is used as data infrastructure.

The master node 30 is a server that performs the overall management of the distributed processing system and functions as a job tracker in a MapReduce process. For example, by using meta information or the like, the master node 30 specifies which data is stored in which of the slave nodes 50. Furthermore, the master node 30 manages tasks or jobs to be assigned to each of the slave nodes 50 and assigns the tasks, such as Map processes or Reduce processes, to the slave nodes 50.

A management server 10 is connected to the master node 30. The management server 10 is a server that creates a rule or the like related to Reduce task and that distributes the rule to each of the nodes. Here, a description will be given of an example in which the management server 10 is connected to the master node 30; however, the configuration is not limited thereto. For example, the management server 10 may also be connected to one of the slave nodes 50 or each of the nodes. Furthermore, the master node 30 or the slave nodes 50 may also have the function of the management server 10.

Each of the slave nodes 50 is a server that performs Map processes and Reduce processes and that functions as a data node, a task tracker, or a job client in a MapReduce process. Furthermore, each of the slave nodes 50 performs a Map task assigned by the master node 30, calculates a hash value of a key in the Map task, and decides a Reduce task at the distribution destination by using the value obtained by the calculation. Then, each of the slave nodes 50 performs the Reduce task assigned by the master node 30.

Figure 2:
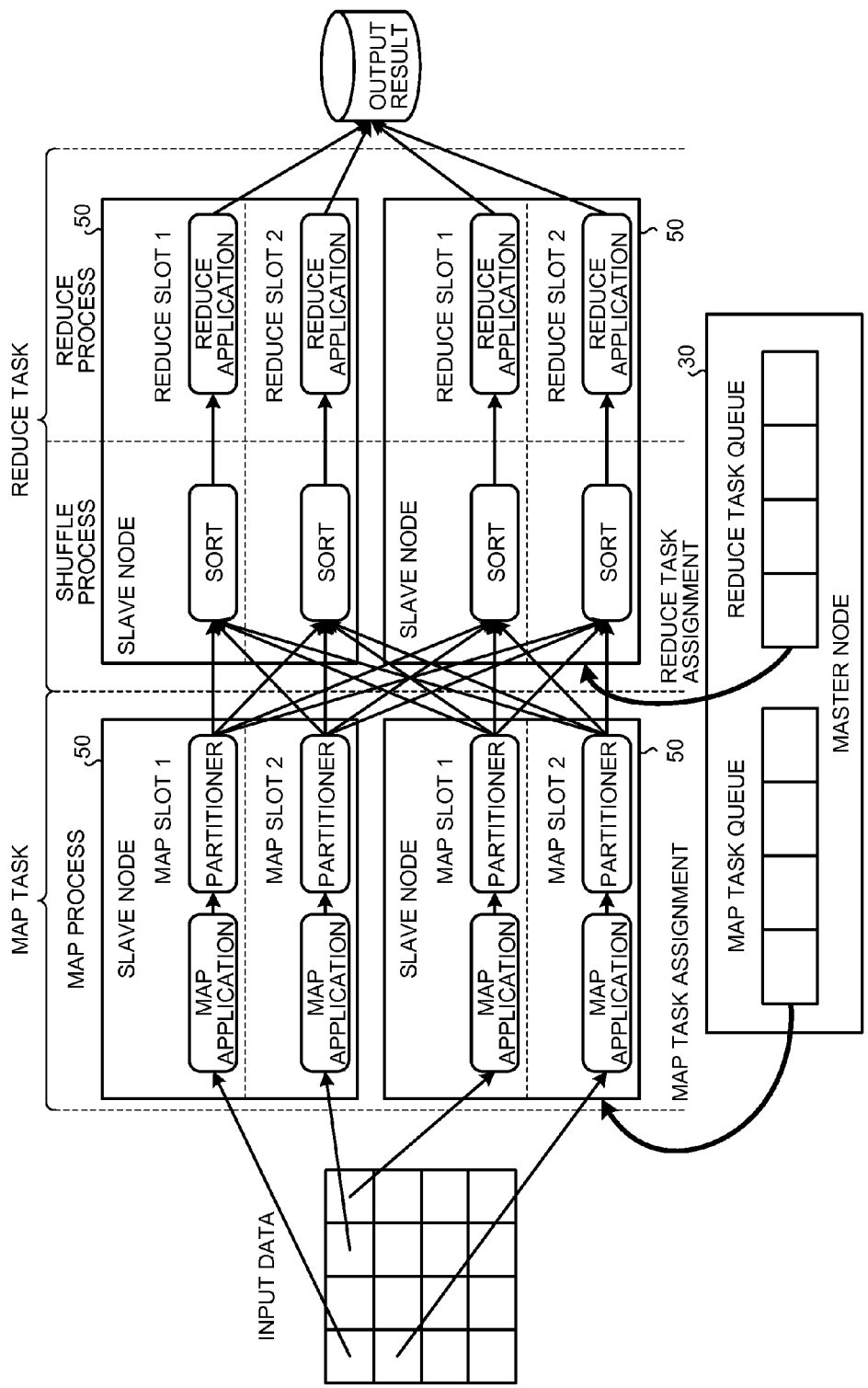
FIG. 2 is a schematic diagram illustrating the mechanism of Hadoop.

In the following, a Map task and a Reduce task performed by each of the slave nodes 50 will be described. FIG. 2 is a schematic diagram illustrating the mechanism of Hadoop.

As illustrated in FIG. 2, the MapReduce process is constituted by a Map task and a Reduce task; the Map task is constituted by Map processes; and the Reduce task is constituted by Shuffle processes and Reduce processes. The master node 30 includes Map task queues and Reduce task queues and assigns Map tasks and Reduce tasks to the slave nodes 50.

Each of the slave nodes 50 includes at least a single Map slot and a single Reduce slot. Each of the slave nodes 50 performs, in a single Map slot, a Map application and Partitioner. The Map application is an application that executes a process desired by a user and Partitioner decides a Reduce task at the distribution destination on the basis of the result obtained from the execution performed by the Map application.

Furthermore, each of the slave nodes 50 performs a Sort process and a Reduce application in a single Reduce slot. The Sort process acquires, from each of the slave nodes 50, data to be used for the assigned Reduce task; sorts the data; and inputs the sort result to the Reduce application. The Reduce application is an application that executes a process desired by a user. In this way, the output result can be obtained by collecting the result obtained from the execution performed by each of the slave nodes 50.

Here, an example of the Map processes, the Shuffle processes, and the Reduce processes will be described. The processes or input data described here is only an example and is not limited.

Map Process

Figure 3:
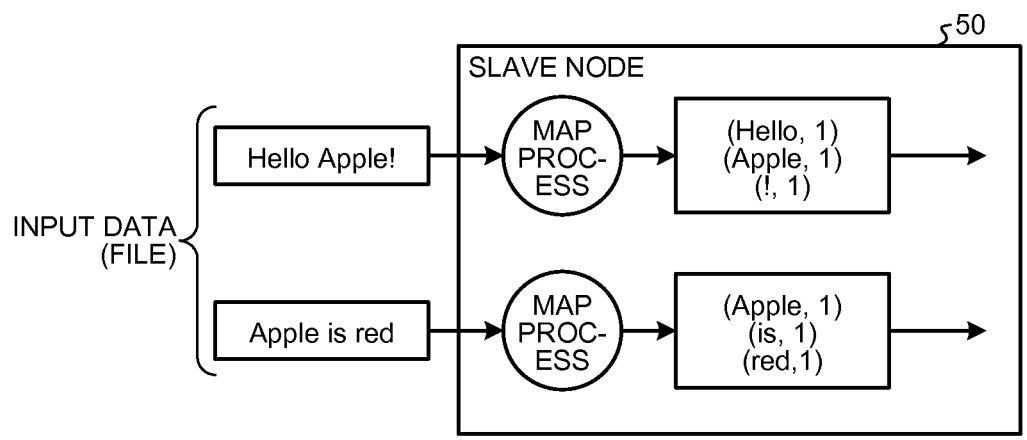
FIG. 3 is a schematic diagram illustrating Map processes.

FIG. 3 is a schematic diagram illustrating Map processes. As illustrated in FIG. 3, each of the slave nodes 50 receives, as input data, "Hello Apple!" and "Apple is red"; performs a Map process to the input data; and outputs a "key, Value" pair.

In the example illustrated in FIG. 3, the slave node 50 performs the Map process on "Hello Apple!", counts the number of elements in the input data, and outputs the "key, Value" pair in which the element is indicated by the "key" and the counted result is indicated by the "Value". Specifically, the slave node 50 creates "Hello, 1", "Apple, 1", and "!, 1" from the input data "Hello Apple!". Similarly, the slave node 50 creates "Apple, 1", "is, 1", and "red, 1" from the input data "Apple is red".

Shuffle Process

Figure 4:
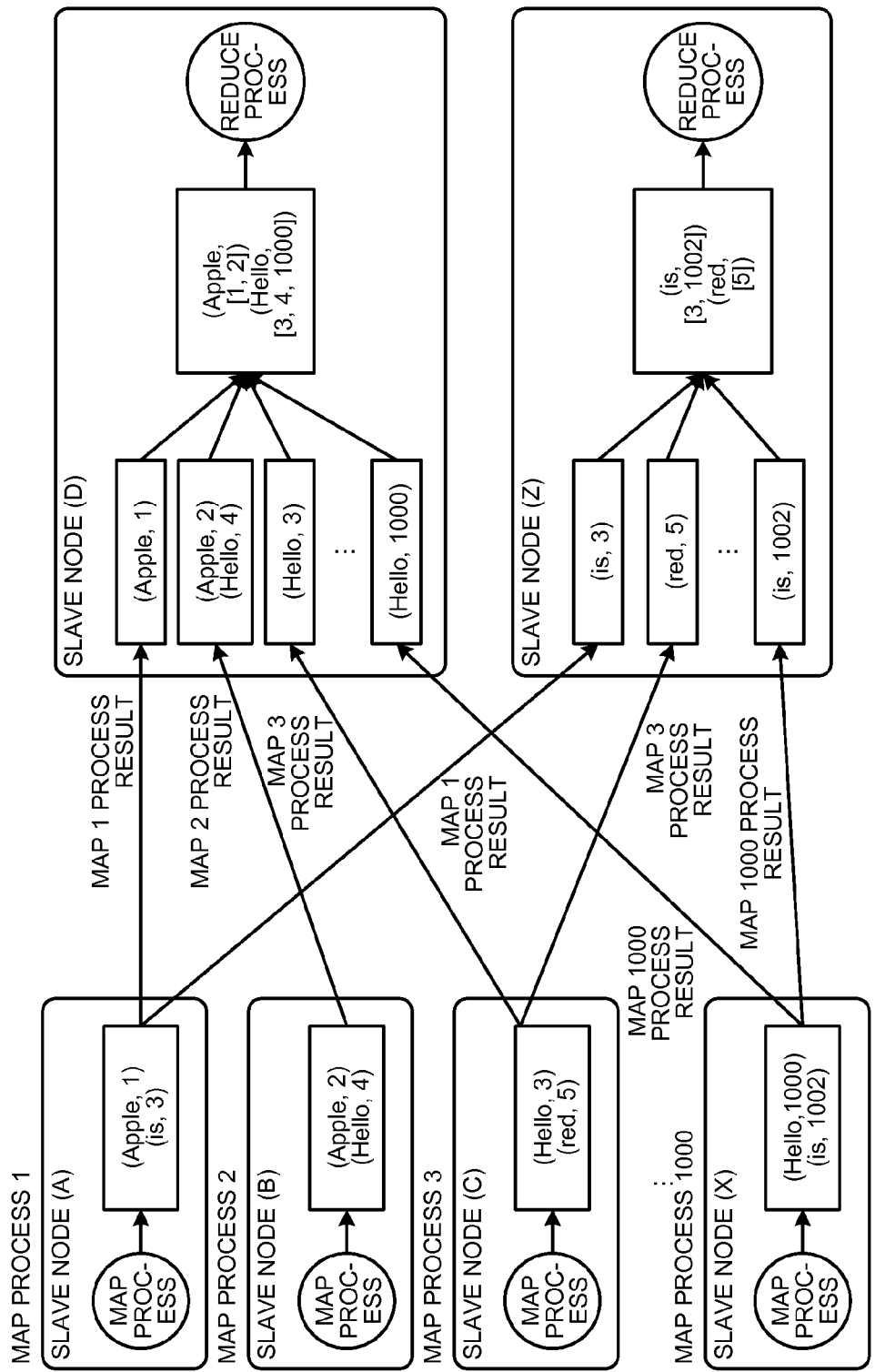
FIG. 4 is a schematic diagram illustrating a Shuffle process.

FIG. 4 is a schematic diagram illustrating a Shuffle process. As illustrated in FIG. 4, each of the slave nodes 50 acquires the result of the Map process from each of the slave nodes and performs a Shuffle process.

In the example illustrated in FIG. 4, slave nodes (A), (B), (C), . . . , and (X) perform the Map process tasks belonging to the same job (for example, Job ID=20) and slave nodes (D) and (Z) perform the Reduce process tasks belonging to the Job ID of 20.

For example, the slave node (A) performs a Map process 1 and creates "Apple, 1" and "is, 3"; the slave node (B) performs a Map process 2 and creates "Apple, 2" and "Hello, 4"; and a slave node (C) performs a Map process 3 and creates "Hello, 3" and "red, 5". The slave node (X) performs a Map process 1000 and creates "Hello, 1000" and "is, 1002".

Subsequently, the slave node (D) and the slave node (Z) acquire the results, which are used in assigned Reduce tasks, of the Map processes performed by the slave nodes and then sort and merge the results. Specifically, it is assumed that the Reduce tasks for "Apple" and "Hello" are assigned to the slave node (D) and the Reduce tasks for "is" and "red" are assigned to the slave node (Z).

In this case, the slave node (D) acquires, from the slave node (A), "Apple, 1" that is the result of the Map process 1 and acquires, from the slave node (B), "Apple, 2" and "Hello, 4" that are the result of the Map process 2. Furthermore, the slave node (D) acquires, from the slave node (C), "Hello, 3" that is the result of the Map process 3 and acquires, from the slave node (X), "Hello, 1000" that is the result of the Map process 1000. Then, the slave node (D) sorts and merges the results and then creates "Apple, [1, 2]" and "Hello, [3, 4, 1000]".

Similarly, the slave node (Z) acquires, from the slave node (A), "is, 3" that is the result of the Map process 1; acquires, from the slave node (C), "red, 5" that is the result of the Map process 3; and acquires, from the slave node (X), "is, 1002" that is the result of the Map process 1000. Then, the slave node (Z) sorts and merges the results and then creates "is, [3, 1002]" and "red, [5]".

Reduce Process

Figure 5:
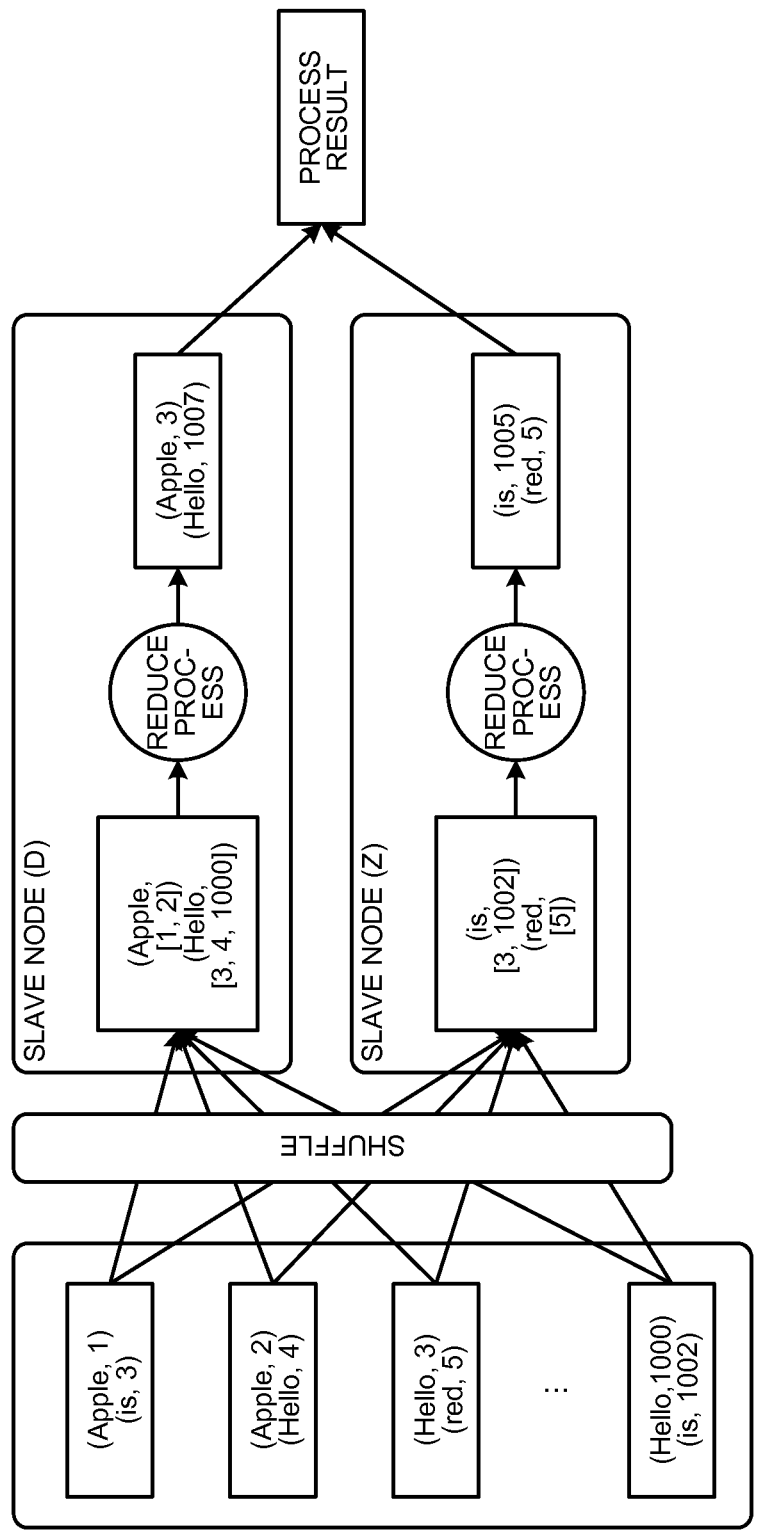
FIG. 5 is a schematic diagram illustrating Reduce processes.

In the following, the Reduce processes performed by the slave nodes 50 will be described. FIG. 5 is a schematic diagram illustrating Reduce processes. As illustrated in FIG. 5, each of the slave nodes 50 uses the Shuffle result created from the results of the Map processes that are performed by the slave nodes and then performs the Reduce processes. Specifically, similarly to the explanation of the Shuffle process, it is assumed that the Reduce process task for "Apple" and "Hello" is assigned to the slave node (D) and the Reduce process task for the "is" and "red" is assigned to the slave node (Z).

In this example, the slave node (D) adds values from "Apple, [1, 2]" and "Hello, [3, 4, 1000]" that are the result of the Shuffle process and then creates, as the result of the Reduce process, "Apple, 3" and "Hello, 1007". Similarly, the slave node (Z) adds values from "is, [3, 1002]" and "red, [5]" that are the result of the Shuffle process and then creates, as the result of the Reduce process, "is, 1005" and "red, 5".

In this state, when the management server 10 assigns input data to normal Reduce tasks and a spare Reduce task that are performed by using the results of the Map processes, the management server 10 assigns, to the spare Reduce task, input data with smaller amount than any of amounts of the input data which is assigned to the normal Reduce tasks. The master node 30 assigns, to the slave nodes 50 that perform the Reduce processes in the MapReduce process, the normal Reduce tasks and the spare Reduce task, to which the input data is assigned, such that the spare Reduce task is started after the assignment of all of the Reduce tasks.

Accordingly, the distributed processing system according to the first embodiment provides a spare Reduce task, assigns a key with a small number of appearances or a key that is not included in a sample to the spare Reduce task, and performs the spare Reduce task after the normal Reduce tasks. Consequently, the execution time of each task is equalized and thus the processing time can be shortened.

Functional Configuration of the Management Server

Figures 6, 7:
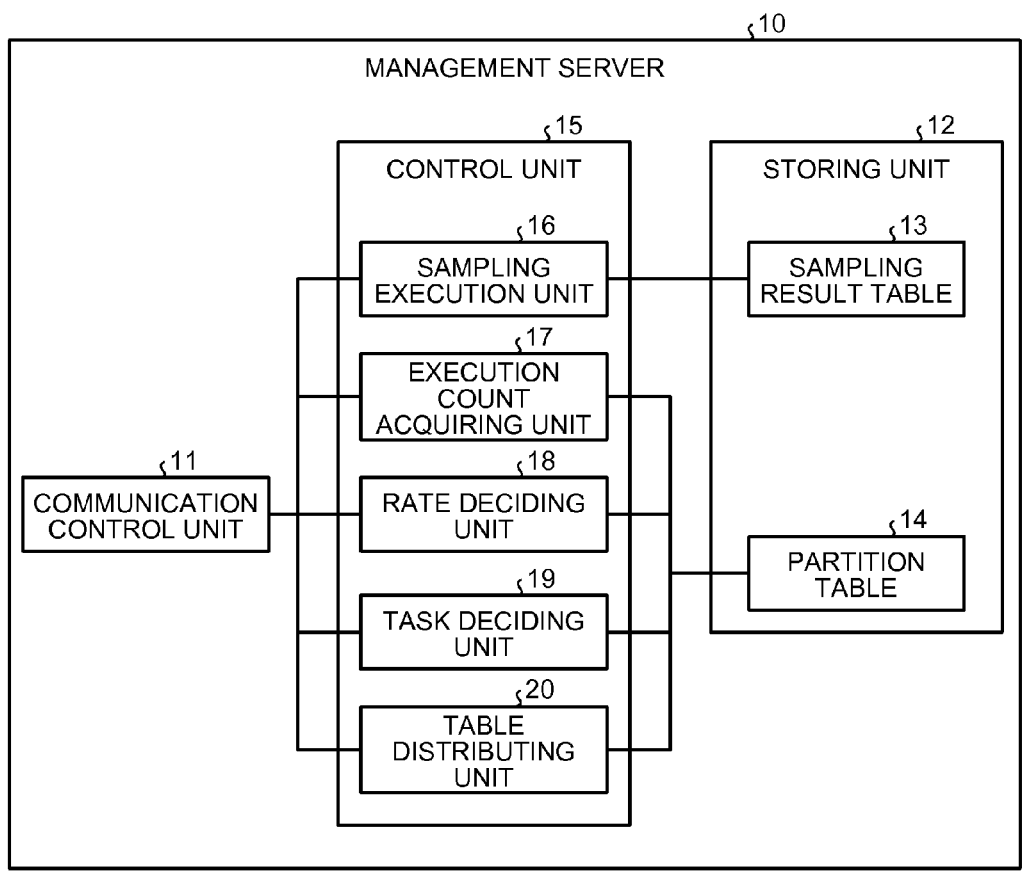
FIG. 6 is a functional block diagram illustrating the functional configuration of a management server.
FIG. 7 is a schematic diagram illustrating an example of information stored in a sampling result table.

FIG. 6 is a functional block diagram illustrating functional configuration of a management server. As illustrated in FIG. 6, the management server 10 includes a communication control unit 11, a storing unit 12, and a control unit 15.

The communication control unit 11 is a processing unit that controls communication with the master node 30 and is, for example, a network interface card or the like. The communication control unit 11 sends the assignment rule or the like created by the control unit 15 to the master node 30.

The storing unit 12 is a storing unit that stores therein program executed by the control unit 15 or various kinds of data and is, for example, a hard disk, a memory, or the like. The storing unit 12 stores therein a sampling result table 13 and a partition table 14. Furthermore, in the embodiment, the management server 10 can set five tasks as the Reduce tasks and stores, in the storing unit 12 or the like, information indicating that one of the tasks is set as a spare Reduce task. Partitioner in each of the slave nodes 50 holds the minimum amount of information.

The sampling result table 13 stores therein the result of the sampling of the number of appearances of a key in the input data. FIG. 7 is a schematic diagram illustrating an example of information stored in a sampling result table. As illustrated in FIG. 7, the sampling result table 13 stores therein, in an associated manner "the main key and the number of appearances".

The "main key" stored here is information that specifies a key included in input data and the "number of appearances" is the number of appearances of the main key in the input data. FIG. 7 illustrates, after the input data is sampled, the number of appearances of a bank A is 100 times, the number of appearances of a bank B is 80 times, the number of appearances of a bank C is 60 times, the number of appearances of a bank D is 30 times, and the number of appearances of a bank E is 20 times.

Figures 8, 9, 10:
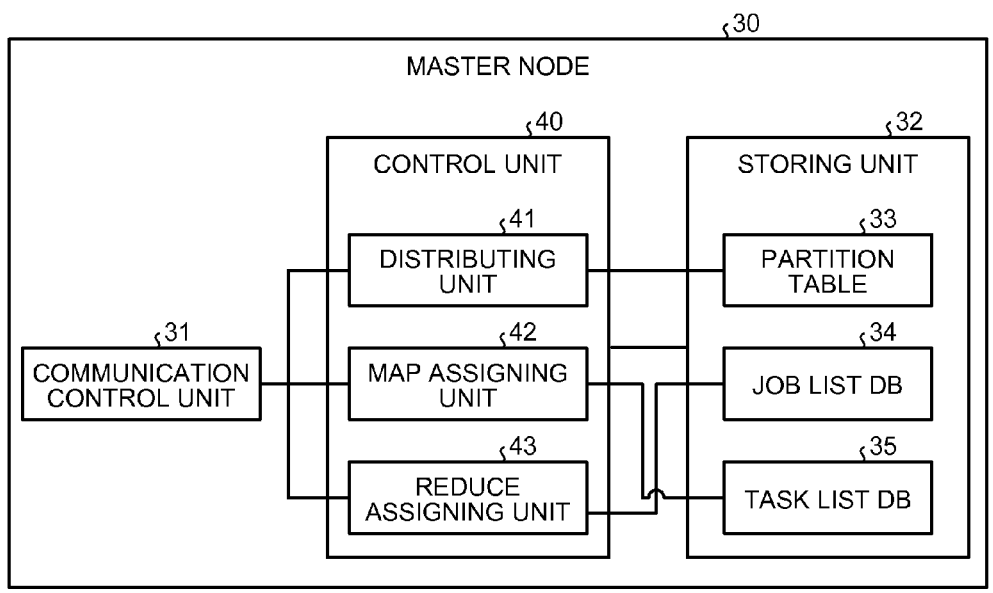
FIG. 8 is a schematic diagram illustrating an example of information stored in a partition table.
FIG. 9 is a functional block diagram illustrating the functional configuration of a master node.
FIG. 10 is a schematic diagram illustrating an example of information stored in a job list DB.

The partition table 14 stores therein information related to the distribution destination of the Reduce task. FIG. 8 is a schematic diagram illustrating an example of information stored in a partition table. As illustrated in FIG. 8, the partition table 14 stores therein, in an associated manner "the Reduce ID, the key to be processed, and the total number of appearances". The "Reduce ID" stored here is information that specifies a Reduce task that performs a process on the main key and is assigned in the descending order of the total number of appearances. The "key to be processed" is a key that is targeted for a process in a Reduce task. The "total number of appearances" is the number of appearances of a key obtained from the sampling result.

The example illustrated in FIG. 8 indicates that, for the Reduce task with the Reduce ID of 0, the key (the bank A) in which the total number of appearances is 100 at the time of sampling is assigned and indicates that, for the Reduce task with the Reduce ID of 1, the key (the bank B) in which the total number of appearances is 80 at the time of sampling is assigned. Similarly, the example illustrated in FIG. 8 indicates that, for the Reduce task with the Reduce ID of 2, the key (the bank C) in which the total number of appearances is 60 at the time of sampling is assigned and indicates that, for the Reduce task with the Reduce ID of 3, the keys (the bank D and the bank E) in which the total number of appearances are 30 and 20, respectively, at the time of sampling are assigned.

The control unit 15 is a processing unit that manages the overall process performed by the management server 10 and is, for example, a processor or the like. The control unit 15 includes a sampling execution unit 16, an execution count acquiring unit 17, a rate deciding unit 18, a task deciding unit 19, and a table distributing unit 20. The sampling execution unit 16, the execution count acquiring unit 17, the rate deciding unit 18, the task deciding unit 19, and the table distributing unit 20 are an example of an electronic circuit included in a processor or an example of a process executed by the processor.

The sampling execution unit 16 is a processing unit that samples input data and investigates the number of appearances of a key. Specifically, the sampling execution unit 16 refers to a predetermined number of pieces of the input data, acquires the appeared key and the number of appearances of the key, and stores them in the sampling result table 13. The timing of the sampling may be arbitrarily set, such as before the Map process is started or the timing at which input data is read in the Map process.

The execution count acquiring unit 17 is a processing unit that acquires the number of parallel executions in an execution environment. Specifically, the execution count acquiring unit 17 acquires, from each of the slave nodes 50, the number of Reduce slots that are previously set in each of the slave nodes 50.

The rate deciding unit 18 is a processing unit that decides the percentage of the keys that are to be assigned to Reduce tasks excluding a spare Reduce task. Specifically, the rate deciding unit 18 decides the percentage of the keys included in the Reduce tasks by using main key information stored in the sampling result table 13, by using the number of parallel execution acquired by the execution count acquiring unit 17, by using the number of Reduce tasks that can be subjected to the parallel execution, or the like.

For example, the rate deciding unit 18 sets the percentage of the keys targeted for the algorithm, such as Bin Packing, to (rate)=0.99 if the number of main keys is equal to or less than the number of Reduce tasks and sets the percentage of the keys to percentage (rate)=1−1/the number of Reduce tasks if the number of main keys is greater than that of the Reduce tasks.

For example, a description will be given of a case in which, after the sampling result illustrated in FIG. 7 is obtained, the number of Reduce tasks is five (including a single spare Reduce task). In this case, in FIG. 7, because the number of main keys is five and the number of normal Reduce tasks is four, the rate deciding unit 18 calculates the percentage as "percentage (rate)=1−1/the number of normal Reduce tasks=0.75". Furthermore, if the number of main keys is five and the number of Reduce tasks is equal to or greater than five, the rate deciding unit 18 decides the percentage as "percentage (rate)=0.99".

Furthermore, if, for example, the number of types of the main key is less than the number of parallel executions or is equal to or less than the number of parallel executions, the rate deciding unit 18 may also set the percentage to 0.99 and, if the number of types of the main key is greater than that of the parallel executions, the rate deciding unit 18 may also perform the process described above.

The task deciding unit 19 is a processing unit that assigns, by using the percentage decided by the rate deciding unit 18, a key to a Reduce task. Specifically, first, the task deciding unit 19 calculates a threshold of the number of appearances of a key to be assigned to Reduce tasks and then creates an assignment rule of the key to each of the Reduce tasks.

For example, a description will be given of a case in which, after the sampling result illustrated in FIG. 7 is obtained, the number of normal Reduce tasks is four and the percentage (rate) is 0.99. First, the task deciding unit 19 calculates the "total Records" that is the sum of the main keys obtained from the sampling result as "290" and calculates the total Record (290)×rate (0.9)=261 as a threshold.

Then, because the number of Reduce tasks is four, the task deciding unit 19 sets the Reduce IDs to 0, 1, 2, and 3. Then, the task deciding unit 19 assigns the key (the bank A), in which the number of appearances of the key is the greatest, to the task with the Reduce ID of 0, which is the smallest value among the Reduce IDs and in which the total number of assigned appearances is the smallest, and then sets "the Reduce ID, the key to be processed, and the total number of appearances" to "0, the bank A, and 100", respectively.

Subsequently, because the already-assigned total number of appearances is 100 and does not exceed the threshold of 261, the task deciding unit 19 continues the assignment and ends the assignment if, for example, the already-assigned total number of appearances is equal to or greater than 261. Specifically, the task deciding unit 19 assigns the key (the bank B), which has the greatest total number of appearances from among the keys that have not been assigned, to the task, in which the assigned total number of appearances is the minimum and the value of the Reduce ID is the minimum, i.e., 1, and then sets "the Reduce ID, the key to be processed, and the total number of appearances" to "1, the bank B, and 80", respectively.

Similarly, because the already-assigned total number of appearances so far is 180 and does not exceed the threshold of 261, the task deciding unit 19 continues the assignment. Specifically, the task deciding unit 19 assigns the key (the bank C), which has the greatest total number of appearances from among the keys that have not been assigned, to the task, in which the assigned total number of appearances is the minimum and the value of the Reduce ID is the minimum, i.e., 2, and then sets "the Reduce ID, the key to be processed, and the total number of appearances" to "2, the bank C, and 60", respectively.

Similarly, because the already-assigned total number of appearances so far is 240 and does not exceed the threshold of 261, the task deciding unit 19 continues the assignment. Specifically, the task deciding unit 19 assigns the key (the bank D), which has the greatest total number of appearances from among the keys that have not been assigned, to the task, in which the assigned total number of appearances is the minimum and the value of the Reduce ID is the minimum, i.e., 3, and then sets "the Reduce ID, the key to be processed, and the total number of appearances" to "3, the bank D, and 30", respectively.

Similarly, because the already-assigned total number of appearances so far is 260 and does not exceeds the threshold of 261, the task deciding unit 19 continues the assignment. Specifically, the task deciding unit 19 assigns unassigned key (the bank E) to the task, in which the assigned total number of appearances is the minimum and the value of the Reduce ID is the minimum, i.e., 3. Then, the task deciding unit 19 adds "the Reduce ID, the key to be processes, and the total number of appearances" to "3, the bank E, and 20" and sets "the Reduce ID, the key to be processed, and the total number of appearances" as "3, the bank D+the bank E, and 50 (30+20)".

Here, because the already-assigned total number of appearances so far is 280 and exceeds the threshold of 261, the task deciding unit 19 ends the assignment. In this way, the task deciding unit 19 can create the partition table 14 illustrated in FIG. 8 as the assignment rule of the Reduce tasks.

The table distributing unit 20 is a processing unit that distributes the partition table 14 to the master node 30. Specifically, if a notification of the end of the process is received from the task deciding unit 19, the table distributing unit 20 reads the partition table 14 that is created by the task deciding unit 19 and is stored in the storing unit 12 and then distributes the read partition table 14 to the master node 30.

Functional Configuration of the Master Node

FIG. 9 is a functional block diagram illustrating the functional configuration of a master node. As illustrated in FIG. 9, the master node 30 includes a communication control unit 31, a storing unit 32, and a control unit 40.

The communication control unit 31 is a processing unit that controls communication with the management server 10 or each of the slave nodes 50 and is, for example, a network interface card or the like. The communication control unit 31 receives the partition table 14 or the like from the management server 10 and sends the partition table 14 to the master node 30.

The storing unit 32 is a storing unit that stores therein programs executed by the control unit 40 or various data and is, for example, a hard disk, a memory, or the like. The storing unit 32 stores therein a partition table 33, a job list DB 34, and a task list DB 35.

The partition table 33 stores therein the partition table 14 sent by the management server 10. The partition table 33 is the same as the partition table 14 explained with reference to FIG. 8; therefore, a description thereof in detail will be omitted.

The job list DB 34 is a database that stores therein job information on a distribution process target. FIG. 10 is a schematic diagram illustrating an example of information stored in a job list DB. As illustrated in FIG. 10, the job list DB 34 stores therein, in an associated manner "the Job ID, the total number of Map tasks, the total number of Reduce tasks, and the number of spare Reduce tasks".

The "Job ID" stored here is an identifier for identifying a job. The "total number of Map tasks" is the total number of Map process tasks included in a job. The "total number of Reduce tasks" is the total number of Reduce process tasks included in a job. The "number of spare Reduce tasks" is the number of tasks used for a spare Reduce task from among the total number of Reduce tasks. The "Job ID, the total number of Map tasks, the total number of Reduce tasks, and the number of spare Reduce tasks" are set and updated by an administrator or the like.

The example illustrated in FIG. 10 indicates that the job with the "Job ID" of "Job001" is constituted by six Map process tasks and five Reduce process tasks and indicates that one of the tasks is used for a spare Reduce task. Similarly, the example illustrated in FIG. 10 indicates that the job with the "Job ID" of "Job002" is constituted by four Map process tasks and two Reduce process tasks and indicates that one of the tasks is used for a spare Reduce task.

The task list DB 35 is a database that stores therein information related to a Map process task or a Reduce process task. FIG. 11 is a schematic diagram illustrating an example of information stored in a task list DB. As illustrated in FIG. 11, the task list DB 35 stores therein "the Job ID, the Task ID, the type, the slave ID of a slave that includes therein data, the state, assignment slave ID, and the number of needed slots".

The "Job ID" stored here is an identifier for identifying a job. The "Task ID" is an identifier for identifying a task. The "type" is information indicating a Map process or a Reduce process. The "slave ID of a slave that includes therein data" is an identifier that identifying a slave node that holds a Map data to be processed and is, for example, a host name. The "state" indicates one of the states from among a process completion (Done) state of a target task, an active (Running) state, and a pre-assignment (Not assigned) state.

The "assignment slave ID" is an identifier for identifying a slave node to which a task is assigned and is, for example, a host name or the like. The "number of needed slots" is the number of slots that are used to perform the task.

In the case illustrated in FIG. 11, for the job with the "Job ID" of "Job001", the Map process task "Map000" that uses a single slot is assigned to the slave node 50 of the "Node1". Furthermore, the case illustrated in FIG. 11 indicates that the slave node 50 of the "Node1" acquires data from the slave node of "Node1" and the slave node of "Node2", executes a Map process, and the execution has been completed.

Furthermore, the case illustrated in FIG. 11 indicates that, for the job with the "Job ID" of "Job001", the Reduce process task "Reduce002" executed by using a single slot is before the assignment performed by Partitioner.

The Job ID, the Task ID, and the type are created in accordance with the information stored in the job list DB 34. The slave ID of the slave in which data is present can be specified by meta information or the like. The state is updated in accordance with an assignment state of a task, the processing result obtained from the slave node 50, or the like. The assignment slave ID is updated when the task is assigned. The number of needed slots can previously be specified, for example, a single slot for a task.

The control unit 40 is a processing unit that manages the overall process performed by the master node 30 and includes a distributing unit 41, a Map assigning unit 42, and a Reduce assigning unit 43. The control unit 40 is an electronic circuit, such as a processor or the like. The distributing unit 41, the Map assigning unit 42, and the Reduce assigning unit 43 are an example of electronic circuits or an example of a process performed by the control unit 40.

The distributing unit 41 is a processing unit that receives the partition table 33 from the management server 10; that stores the partition table 33 in the storing unit 32; and that distributes the partition table 33 to each of the slave nodes 50. With this process, the partition table 14, i.e., the assignment rule of the Reduce task created by the management server 10, is stored in each of the nodes in a shared manner.

The Map assigning unit 42 is a processing unit that assigns a Map task that is a task of a Map process performed in each job to a Map slot in each of the slave nodes 50. Then, the Map assigning unit 42 updates the "assignment slave ID", the "state", or the like illustrated in FIG. 11.

For example, if the Map assigning unit 42 receives an assignment request for a Map task from one of the slave nodes 50 or the like, the Map assigning unit 42 refers to the task list DB 35 and specifies a Map task in which the "state" is "Not assigned". Thereafter, if there is a Map task that is included in the slave node 50 that has sent the assignment request with the ID of the "slave ID indicating that data is present", the Map assigning unit 42 selects the Map task with priority. If such a Map task is not present, the Map assigning unit 42 selects a Map task by using an arbitrary method and uses the selected Map task as an assignment target Map task. Then, the Map assigning unit 42 stores the ID of the slave node 50 that has sent the assignment request in the "assignment slave ID" of the assignment target Map task.

Thereafter, the Map assigning unit 42 notifies the slave node 50 that is the specified assignment destination of the Task ID, the slave ID indicating that data is present, the number of needed slots, or the like and assigns the Map task. Furthermore, the Map assigning unit 42 updates the "state" of the assigned Map task from "Not assigned" to "Running".

The Reduce assigning unit 43 is a processing unit that assigns a Reduce task to a Reduce slot in the slave node 50. Specifically, the Reduce assigning unit 43 assigns each Reduce task to a Reduce slot in accordance with the assignment rule of the Reduce task stored in the partition table 33, the managed number of spare Reduce tasks, or the like. In accordance with the assignment, the Reduce assigning unit 43 updates the task list DB 35 as needed. Namely, the Reduce assigning unit 43 associates Reduce tasks (Reduce IDs) with the slave nodes 50 and performs assignment by using a main key instead of a hash value.

For example, the Reduce assigning unit 43 sequentially assigns, to Reduce slots, the Reduce tasks in the partition table 33 in an ascending order of the Reduce IDs. At this time, for example, the Reduce assigning unit 43 may also assign a Reduce task to an arbitrary Reduce slot or assign, with priority, a Reduce task to a Reduce slot.

In the following, a description will be given of a case, as an example, in which the partition table 33 that stores therein the same information as that illustrated in FIG. 8 stores therein four Reduce tasks targeted for assignment, a single spare Reduce task, three Reduce slots, a single Reduce slot included in each slave node.

In this case, because the number of Reduce tasks is five and the number of Reduce slots is three, the Reduce assigning unit 43 assigns, to each of the slave nodes 50, the Reduce task with the Reduce ID of 0, the Reduce task with the Reduce ID of 1, and the Reduce task with the Reduce ID of 2. Then, if one of the Reduce tasks of the slave nodes 50 has ended, the Reduce assigning unit 43 assigns the unassigned Reduce task with the Reduce ID of 3 to the corresponding slave node 50.

Furthermore, if any one of the Reduce tasks of the slave nodes 50 has ended, the Reduce assigning unit 43 assigns an unassigned spare Reduce task to the corresponding slave node 50. Furthermore, the Reduce assigning unit 43 may also acquire the information in which the Reduce ID of Reduce tasks including a spare Reduce task is associated with keys of the process target from any of the slave nodes 50 or may also perform determination in the own device.

For example, if Reduce IDs are IDs with its number being sequentially increased by one, because, from among five tasks, the number of Reduce tasks is four and the number of spare Reduce tasks is one, the Reduce assigning unit 43 can specify that the Reduce ID of the spare Reduce task is 4. Accordingly, the Reduce assigning unit 43 can assign the spare Reduce task with the Reduce ID of 4 to the slave node 50 in which the Reduce task has ended.

In this way, the Reduce assigning unit 43 sequentially assigns Reduce tasks to the Reduce slot in each of the slave nodes 50 in the order the Reduce ID is small, i.e., in the order of the Reduce tasks that are frequently appeared and then assigns a spare Reduce task last. Consequently, the spare Reduce task is started after the assignment of all of the normal Reduce tasks.

Configuration of a Slave Node

Figure 12:
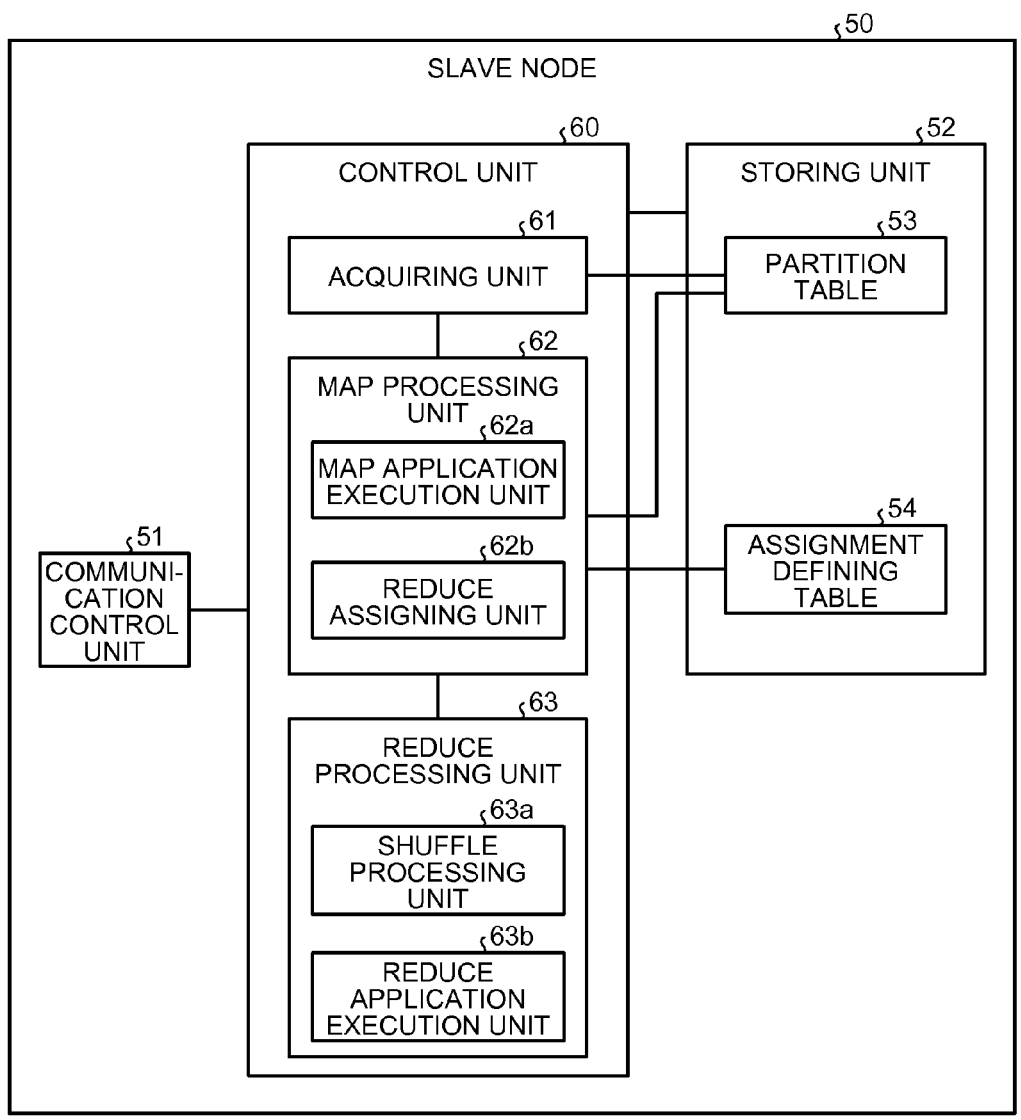
FIG. 12 is a functional block diagram illustrating the functional configuration of a slave node.

FIG. 12 is a functional block diagram illustrating the functional configuration of a slave node. As illustrated in FIG. 12, the slave node 50 includes a communication control unit 51, a storing unit 52, and a control unit 60.

The communication control unit 51 is a processing unit that performs communication with the master node 30 or the other slave nodes 50 and is, for example, a network interface card or the like. For example, the communication control unit 51 receives assignment of various tasks or the partition table 33 from the master node 30 and sends a completion notification of the various tasks. Furthermore, the communication control unit 51 receives data that is read from the corresponding slave node 50 in accordance with the execution of the various task processes.

The storing unit 52 is a storing unit that stores therein programs executed by the control unit 60 or various data and is, for example, a hard disk, a memory, or the like. The storing unit 52 stores therein a partition table 53 and an assignment defining table 54. Furthermore, the storing unit 52 temporarily stores therein data when various processes are performed. Furthermore, the storing unit 52 stores therein an input of a Map process and an output of a Reduce process.

The partition table 53 stores therein the partition table 33 that is sent from the master node 30. The partition table 53 is the same as the partition table 14 explained with reference to FIG. 8; therefore, a description thereof in detail will be omitted.

The assignment defining table 54 is a database that stores therein, in an associated manner, a Reduce task and a key. Specifically, the assignment defining table 54 stores therein, in an associated manner, the combinations of each of the normal Reduce tasks and the keys of the process target and the combinations of a spare Reduce task and a key of the process target. FIG. 13 is a schematic diagram illustrating an example of information stored in an assignment defining table. As illustrated in FIG. 13, the assignment defining table 54 stores therein, in an associated manner, "the Reduce ID and the key to be processed". The Reduce ID and the key to be processed is the same item as that illustrated in FIG. 6; therefore, descriptions thereof in detail will be omitted.

The example illustrated in FIG. 13 indicates that the Reduce task with the Reduce ID of 0 is the task that processes the key (the bank A) and indicates that the Reduce task with the Reduce ID of 1 is the task that processes the key (the bank B). Furthermore, the example illustrated in FIG. 13 indicates that the Reduce task with the Reduce ID of 2 is the task that processes the key (the bank C) and indicates that the Reduce task with the Reduce ID of 3 is the task that processes the key (the bank D+the bank E).

Furthermore, the example illustrated in FIG. 13 indicates that the Reduce task with the Reduce ID of 4 is a spare Reduce task and is the task that processes the key (the bank F). The assignment of a key to a spare Reduce task will be described later.

The control unit 60 is a processing unit that manages the overall process performed by the slave node 50 and includes an acquiring unit 61, a Map processing unit 62, and a Reduce processing unit 63. The control unit 60 is, for example, an electronic circuit, such as a processor. The acquiring unit 61, the Map processing unit 62, and the Reduce processing unit 63 are an example of electronic circuits or an example of a process performed by the control unit 60.

The acquiring unit 61 is a processing unit that acquires the partition table 33 from the master node 30 and that stores the partition table 33 in the storing unit 52. For example, the acquiring unit 61 acquires timing at which a MapReduce process is started or timing that is previously set or acquires the partition table 33 that is sent from the master node 30 by using the push method.

The Map processing unit 62 includes a Map application execution unit 62a and a Reduce assigning unit 62b and performs, by using the Map application execution unit 62a and the Reduce assigning unit 62b, a Map task assigned by the master node 30.

The Map application execution unit 62a is a processing unit that performs a Map application that is associated with a process specified by a user. Specifically, the Map application execution unit 62a requests, by using heartbeats or the like, the master node 30 to assign a Map task. At this time, the Map application execution unit 62a notifies the number of free slots in each of the slave nodes 50. Then, the Map application execution unit 62a receives, from the master node 30, Map assignment information including the "Task ID, slave ID indicating that data is present, and the number of needed slots" or the like.

Thereafter, if the slave node is one of the slave nodes 50 specified by the "slave ID indicating that data is present", in accordance with the received Map assignment information, the Map application execution unit 62a acquires data from the storing unit 52. If not, the Map application execution unit 62a acquires data from the slave node 50 specified by the "slave ID indicating that data is present" and stores the acquired data in the storing unit 52 or the like. Thereafter, the Map application execution unit 62a performs a Map process by using slots the number of which is specified by the "number of needed slots".

For example, the Map application execution unit 62a sequentially acquires process target data of the assigned Map task one by one from the slave node 50 that stores therein the target data and performs the subject process. Then, the Map application execution unit 62a outputs the process result to the Reduce assigning unit 62b. Furthermore, if a process is performed on all input data of the process target, i.e., if the execution of the Map task has been completed, the Map application execution unit 62a notifies the master node 30 of the completion of the execution.

The Reduce assigning unit 62b is a processing unit that associates a Reduce task (Reduce ID) with a key of the process target. Specifically, the Reduce assigning unit 62b defines the assignment rule of the Reduce tasks stored in the partition table 53 that has been created by the management server 10 and creates and defines the assignment rule of the spare Reduce task. Furthermore, the Reduce assigning unit 62b may also the defined assignment rule to the master node 30.

For example, the Reduce assigning unit 62b acquires the key obtained from the process result that is input from the Map application execution unit 62a and determines whether the acquired key is stored in the partition table 53. Then, if the key of the data related to the process result is stored in the partition table 53, the Reduce assigning unit 62b defines the combination of the subject key and the Reduce ID and stores the combined information in the assignment defining table 54.

In contrast, if the key of the data related to the process result is not stored in the partition table 53, the Reduce assigning unit 62b calculates a hash value of the subject key by using the number of spare Reduce tasks, creates the assignment rule of the spare Reduce task, and stores the created assignment rule in the assignment defining table 54. In the first embodiment, because the number of spare Reduce tasks is one, the hash value is four. This hash value is the same value in each of the slave nodes 50 because the number of Reduce tasks and the spare Reduce tasks is previously determined.

For example, if the key obtained from the process result that is input from the Map application execution unit 62a is the bank A, because the bank A is associated with the Reduce ID of 0, the Reduce assigning unit 62b defines this combination as the process content of the Reduce task. In contrast, if the key obtained from the process result that is input from the Map application execution unit 62a is the bank F, because the Reduce ID associated with the bank F is not present in the partition table 53, the Reduce assigning unit 62b defines the combination of the hash value "4" of the bank F and the key (the bank F) as the process content of the spare Reduce task.

The Reduce processing unit 63 is a processing unit that includes therein a Shuffle processing unit 63a and a Reduce application execution unit 63b and that executes a Reduce task. The Reduce processing unit 63 performs the Reduce task assigned by the master node 30.

The Shuffle processing unit 63a is a processing unit that sorts the results of the Map processes by keys; that merges the records (data) having the same key; and that creates a process target of the Reduce task. Specifically, if a notification is received from the master node 30 indicating that the Map process has ended, the Shuffle processing unit 63a acquires, as a preparation for the execution of a Reduce task of a job belonging to the subject Map process, the result of the subject Map process from each of the slave nodes 50. Then, the Shuffle processing unit 63a sorts the results of the Map processes by previously specified keys, merges the process results having the same key, and stores the merged result in the storing unit 52.

For example, the Shuffle processing unit 63a receives, from the master node 30, information indicating that "Map000, Map001, Map002, and Map003" that are the Map tasks of the "Job ID" of "Job001" have been ended, i.e., a start of the execution of the Reduce process task of the "Job ID" of "Job001". Then, the Shuffle processing unit 63a acquires the result of the Map process from the nodes with the node ID of Node1, Node2, Node3, Node4 or the like. Subsequently, the Shuffle processing unit 63a sorts and merges the result of the Map process and then stores the obtained result in the storing unit 52 or the like.

The Reduce application execution unit 63b is a processing unit that performs a Reduce application that is associated with the process specified by a user. Specifically, the Reduce application execution unit 63b performs the Reduce task assigned by the master node 30.

For example, the Reduce application execution unit 63b receives information related to the Reduce tasks constituted from the "Job ID, the Task ID, the number of needed slots", or the like. Then, the Reduce application execution unit 63b stores the received information in the storing unit 52. Thereafter, the Reduce application execution unit 63b acquires the subject data from each of the slave nodes 50, executes the Reduce application, and stores the obtained result in the storing unit 52. Furthermore, the Reduce application execution unit 63b may also send the result of the Reduce task to the master node 30.

Flow of a Process

In the following, the flow of a process performed by the distributed processing system according to the first embodiment will be described.

Creating Process of a Partition Table

Figure 14:
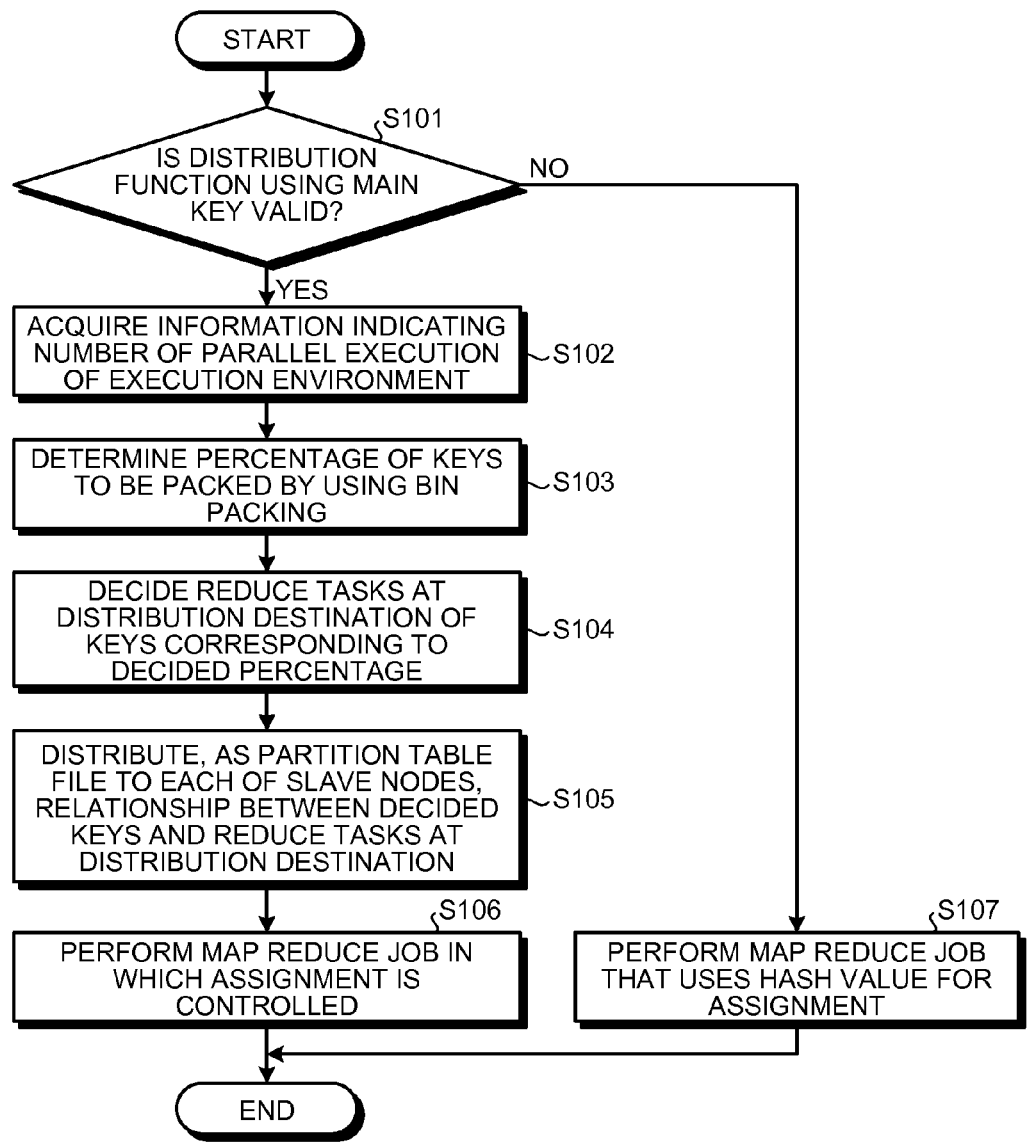
FIG. 14 is a flowchart illustrating the flow of a creating process of the partition table.

FIG. 14 is a flowchart illustrating the flow of a creating process of the partition table. This process is performed by the management server 10.

As illustrated in FIG. 14, the execution count acquiring unit 17 in the management server 10 determines whether the distribution function using a main key is valid (Step S101). For example, the execution count acquiring unit 17 determines whether a manual setting performed by a user is set or determines whether the number of main keys is equal to or greater than a predetermined number in which a distribution effect using the main key can be expected.

If the distribution function using a main key is valid (Yes at Step S101), the execution count acquiring unit 17 acquires information indicating the number of parallel execution of the execution environment (Step S102). For example, the execution count acquiring unit 17 acquires the number of Reduce slots from each of the slave nodes 50 that functions as a task tracker or a job client. Furthermore, the execution count acquiring unit 17 acquires the number of Reduce tasks that is previously specified by an administrator or the like.

Subsequently, the rate deciding unit 18 determines a percentage of keys to be packed by using Bin Packing or the like (Step S103). For example, by using the main key information or the number of Reduce tasks that can be subjected parallel operation stored in the sampling result table 13, the rate deciding unit 18 determines a percentage of keys to be packed in the Reduce task.

Then, the task deciding unit 19 decides the Reduce tasks at the distribution destination of keys the number of which corresponds to the decided percentage (Step S104). For example, the task deciding unit 19 calculates a threshold of the number of appearances to be assigned to the Reduce tasks and then creates the assignment rule of the key to each of the Reduce tasks.

Thereafter, the table distributing unit 20 distributes, as a partition table file to each of the slave nodes 50, the relationship between the decided keys and the Reduce tasks at the distribution destination (Step S105). For example, the table distributing unit 20 distributes the created partition table 14 to each of the slave nodes 50 via the master node 30.

Then, the control unit 15 in the management server 10 performs the Map Reduce job in which assignment is controlled (Step S106). For example, the management server 10 sends, to the master node 30, the execution of the Map Reduce job including the instruction indicating that the Reduce processes are performed by using the partition table 14.

In contrast, if a distribution function using a main key is invalid at Step S101 (No at Step S101), the control unit 15 in the management server 10 performs the Map Reduce job that uses a hash value for the assignment (Step S107). Namely, the management server 10 sends the execution of a general Map Reduce job to the master node 30.

Process of Deciding a Reduce Task

Figure 15:
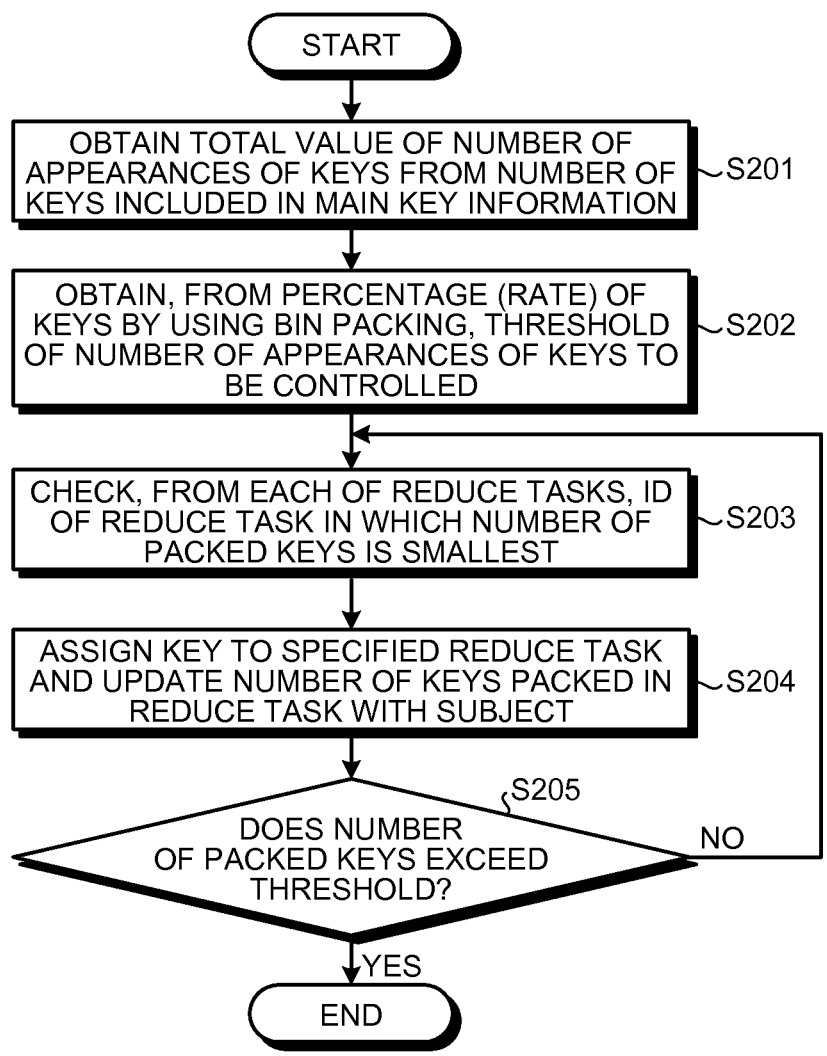
FIG. 15 is a flowchart illustrating the flow of a process of deciding a Reduce task at the distribution destination of a key.

FIG. 15 is a flowchart illustrating the flow of a process of deciding a Reduce task at the distribution destination of a key. This process corresponds to the process at Step S104 illustrated in FIG. 14.

As illustrated in FIG. 15, the task deciding unit 19 in the management server 10 obtains, from the number of keys included in the main key information related to the sampling result, the total value (total Records) of the number of appearances of keys (Step S201). For example, the task deciding unit 19 adds the number of appearances of each key in the sampling result.

Subsequently, the task deciding unit 19 obtains, from the percentage (rate) of keys by using Bin Packing, a threshold of the number of appearances of keys to be controlled by using expression "total Record×rate" (Step S202). For example, the task deciding unit 19 multiplies the total value (total Records) obtained at Step S201 by the percentage calculated at Step S103.

Then, the task deciding unit 19 checks, from each of the Reduce tasks, the ID of the Reduce task in which the number of packed keys is the smallest (Step S203). For example, the task deciding unit 19 refers to the partition table 14 and specifies the ID (Reduce ID) of the Reduce task in which the number of assigned keys is the smallest.

Then, the task deciding unit 19 assigns the key to the Reduce task associated with the specified Reduce ID and updates the number of keys packed in the subject Reduce task (Step S204). For example, the task deciding unit 19 adds the number of appearances of keys that are newly assigned to the Reduce ID to the number of appearances of keys that have already been assigned to the subject Reduce ID.

Thereafter, if the number of packed keys exceeds the threshold (Yes at Step S205), the task deciding unit 19 ends the process. If the number of packed keys does not exceed the threshold (No at Step S205), the task deciding unit 19 repeats the process at Step S203 and the subsequent processes. For example, if the added value of the number of appearances of all of the keys that have already been assigned to each of the Reduce tasks exceeds the threshold calculated at Step S202, the task deciding unit 19 ends the assignment and, if the added value does not exceed the threshold, the task deciding unit 19 performs new assignment until the value exceeds the threshold.

Process Performed by the master Node

Figure 16:
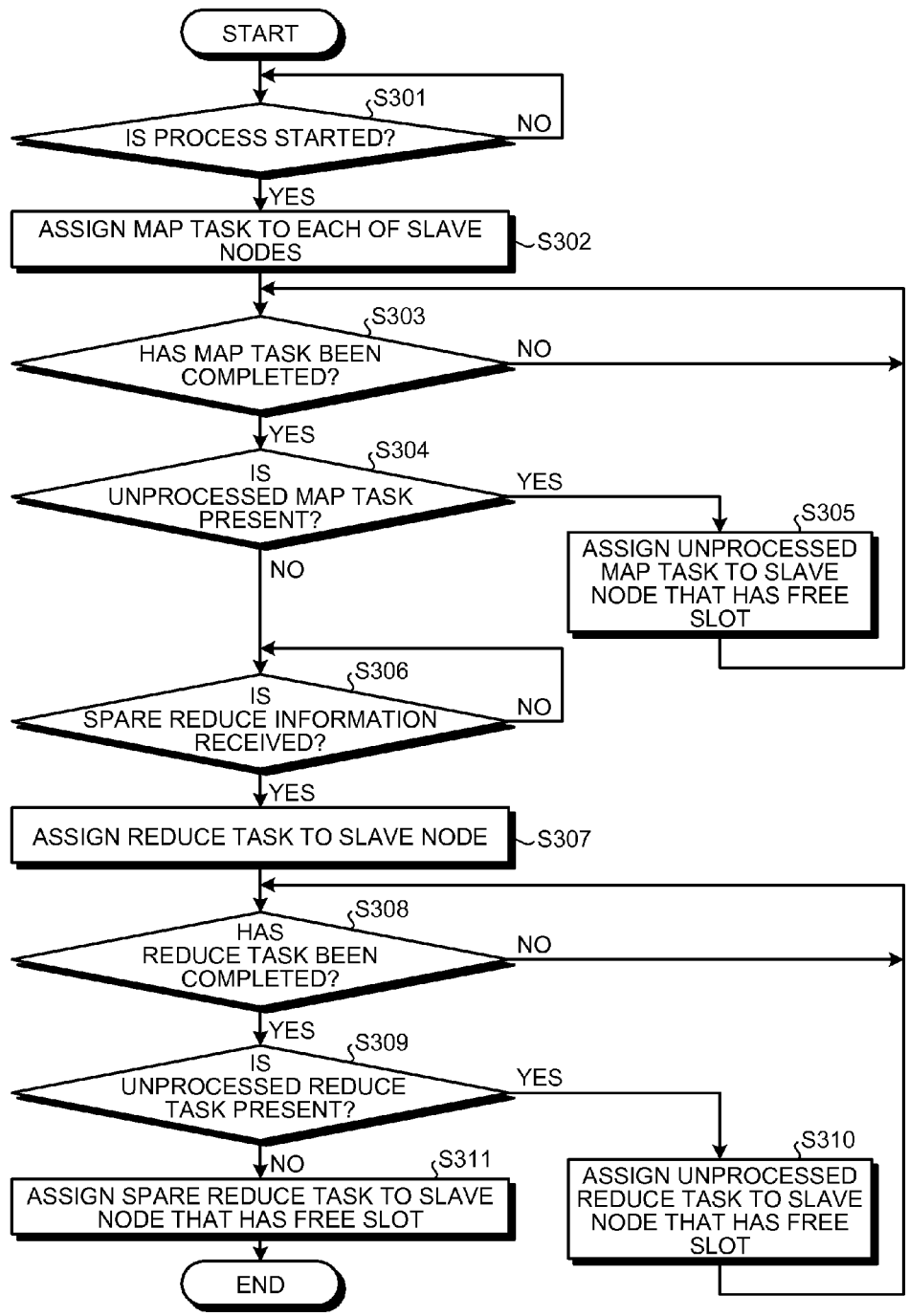
FIG. 16 is a flowchart illustrating the flow of a process performed by a master node.

FIG. 16 is a flowchart illustrating the flow of a process performed by a master node. The flow of the process explained here is only an example and, for example, the assignment a Map process, a Reduce process of each task can be performed in parallel as long as the processes do not conflict each other in the constraint of the MapReduce.

As illustrated in FIG. 16, if a process is started (Yes at Step S301), the Map assigning unit 42 in the master node 30 assigns a Map task to each of the slave nodes 50 (Step S302).

Thereafter, if the Map assigning unit 42 receives a completion notification of the Map task from each of the slave nodes 50 (Yes at Step S303), the Map assigning unit 42 determines whether an unprocessed Map task is present (Step S304).

If an unprocessed Map task is present (Yes at Step S304), the Map assigning unit 42 assigns the unprocessed Map task to the slave node 50 that has a free slot (Step S305) and repeats the process at Step S303 and the subsequent processes.

In contrast, if no unprocessed Map task is present (No at Step S304), the Reduce assigning unit 43 determines whether spare Reduce information is received (Step S306). Because the master node 30 recognizes that a spare Reduce ID is present and performs the subsequent processes regardless of whether a key is actually assigned to the spare Reduce ID, the process at Step S306 is not always needed to be performed.

If the Reduce assigning unit 43 has received the spare Reduce information (Yes at Step S306), the Reduce assigning unit 43 assigns a Reduce task to the slave node 50 (Step S307).

Thereafter, if the Reduce assigning unit 43 receives a completion notification of the Reduce task from the slave node 50 (Yes at Step S308), the Reduce assigning unit 43 determines whether an unprocessed Reduce task is present (Step S309).

If an unprocessed Reduce task is present (Yes at Step S309), the Reduce assigning unit 43 assigns the unprocessed Reduce task to the slave node 50 that has a free slot (Step S310) and repeats the process at Step S308 and the subsequent processes.

In contrast, if no unprocessed Reduce task is present (No at Step S309), the Reduce assigning unit 43 assigns a spare Reduce task to the slave node 50 that has a free slot (Step S311).

Process Performed by the Slave Node

Figure 17:
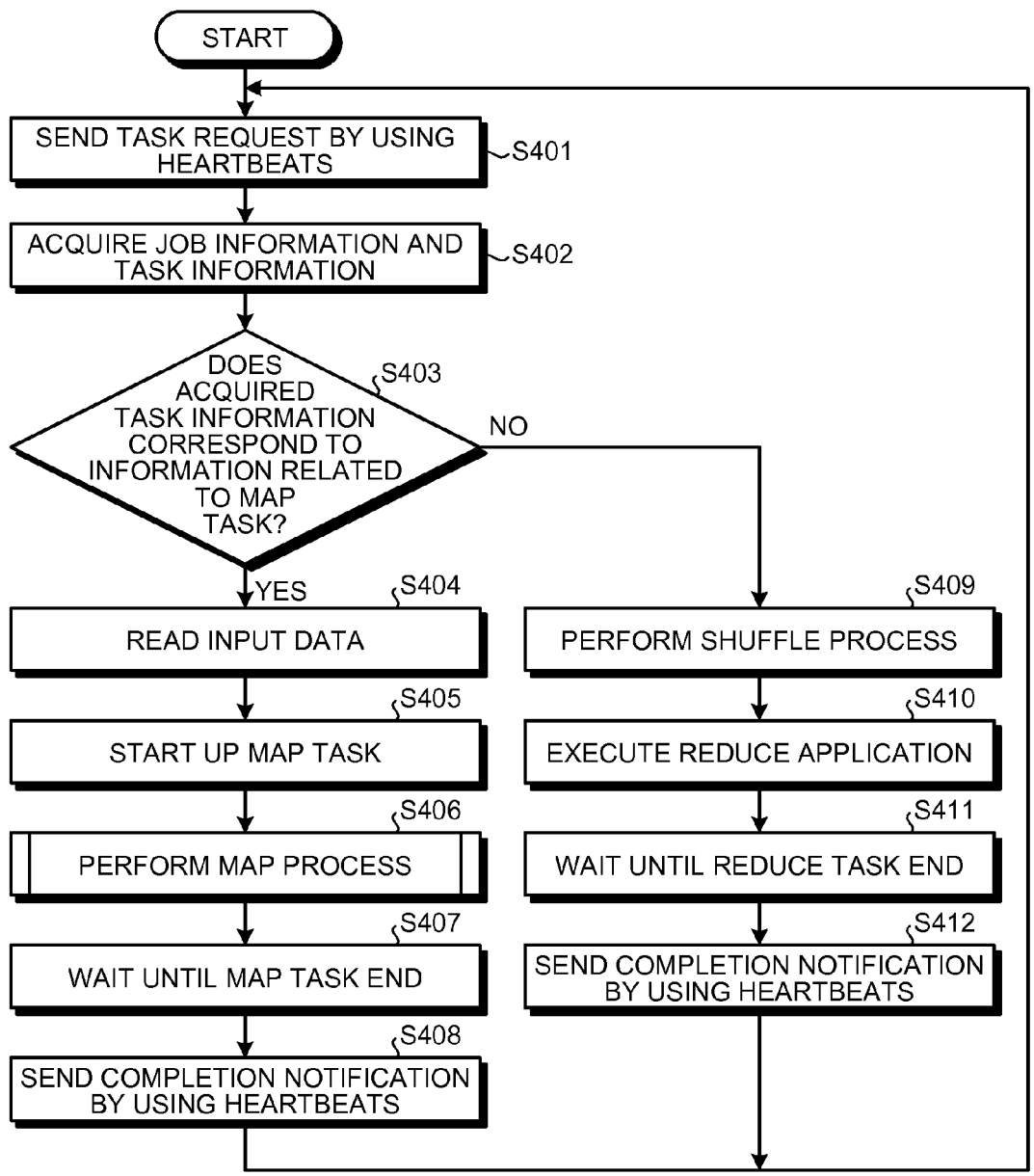
FIG. 17 is a flowchart illustrating the flow of a process performed by a slave node.

FIG. 17 is a flowchart illustrating the flow of a process performed by a slave node. As illustrated in FIG. 17, the slave node 50 sends a task request to the master node 30 by using heartbeats (Step S401).

Then, the slave node 50 acquires job information and task information as a response to the task request (Step S402) and determines whether the acquired task information is information related to the Map task (Step S403).

If the slave node 50 determines that the acquired task information is information related to the Map task (Yes at Step S403), the Map processing unit 62 in the slave node 50 reads the input data (Step S404), starts up the Map task (Step S405), and performs a Map process (Step S406).

Thereafter, the Map processing unit 62 waits until the Map task has ended (Step S407) and, if the Map task has ended, the Map processing unit 62 sends a completion notification or the like of the Map task to the master node 30 by using heartbeats (Step S408).

In contrast, if the acquired task information is information related to the Reduce task (No at Step S403), the Shuffle processing unit 63a performs a Reduce task, acquires the result of the Map process from each of the slave nodes 50, and performs the Shuffle process (Step S409).

Then, the Reduce application execution unit 63b executes the Reduce application by using the result of the Shuffle process (Step S410). Then, the Reduce application execution unit 63b waits until the Reduce task has ended (Step S411) and, if the Reduce task has ended, the Reduce application execution unit 63b sends a completion notification or the like of the Reduce task to the master node 30 by using heartbeats (Step S412).

Map Process

Figure 18:
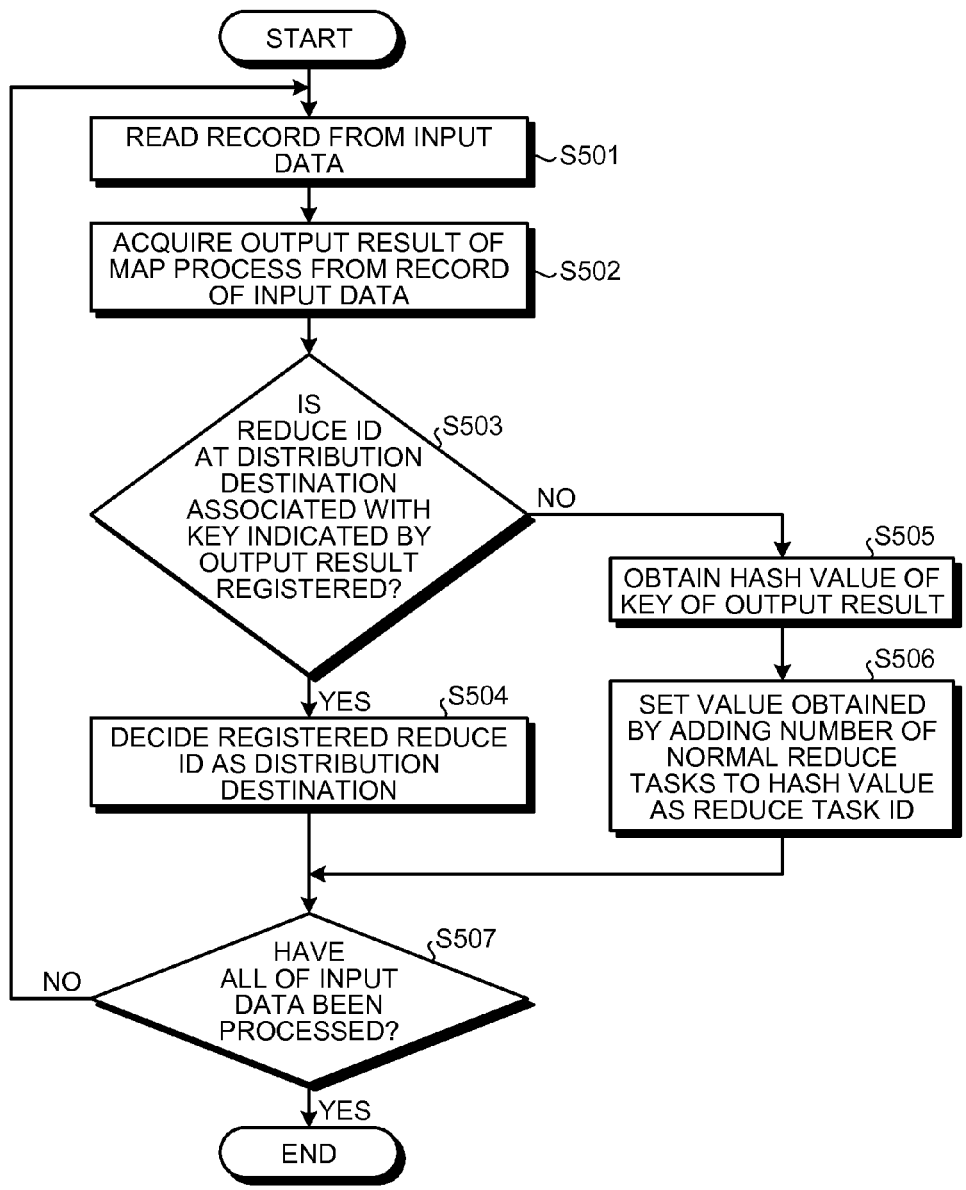
FIG. 18 is a flowchart illustrating the flow of a Map process.

FIG. 18 is a flowchart illustrating the flow of a Map process. This process is performed at Step S406 illustrated in FIG. 17.

As illustrated in FIG. 18, the Map application execution unit 62a in the slave node 50 reads a record from the input data (Step S501), executes the Map application by using the read record, and acquires the output result (Step S502).

Then, the Reduce assigning unit 62b determines whether the Reduce ID at the distribution destination associated with the key indicated by the output result is registered in the partition table 53 (Step S503). If the Reduce ID at the distribution destination associated with the key indicated by the output result is registered in the partition table 53 (Yes at Step S503), the Reduce assigning unit 62b decides the registered Reduce ID as the distribution destination of the subject key and stores the key in the assignment defining table 54 (Step S504).

In contrast, if the Reduce ID at the distribution destination associated with the key indicated by the output result is not registered in the partition table 53 (No at Step S503), the Reduce assigning unit 62b performs the process at Step S505. Namely, the Reduce assigning unit 62b obtains a hash value of the key obtained from the output result. For the calculation of a hash value, the number of the spare Reduce tasks is used.

Subsequently, the Reduce assigning unit 62b stores a value obtained by adding the number of normal Reduce tasks to the calculated hash value in the assignment defining table 54 as the Reduce task ID of the distribution destination (Step S506). For example, the Reduce assigning unit 62b uses, as the ID of the spare Reduce, the value "4" obtained by adding the calculated hash value "0" to the number of normal Reduce tasks "4".

Thereafter, if unprocessed input data still remains (No at Step S507), the Reduce assigning unit 62b repeats the process at Step S501 and the subsequent processes. In contrast, if all of the input data have been processed (Yes at Step S507), the Reduce assigning unit 62b ends the process. At this time, the Reduce assigning unit 62b may also send the created assignment defining table 54 to the master node 30.

Advantage

As described above, on the basis of the number of spare Reduce tasks, the number of the normal Reduce tasks, and the information related to the detected key, the slave node 50 can assign a hash value of a spare Reduce task to a slot. Consequently, the slave node 50 can distribute keys to all of the unique Reduce tasks without adding communication mechanism.

Furthermore, by scheduling the spare Reduce task after scheduling all of the normal Reduce tasks, even if key information obtained at the sampling is inaccurate, the master node 30 assigns a spare Reduce task for each optimum Reduce slot. Consequently, the time taken to complete the execution of Reduce tasks executed by Reduce slots can be equalized and thus it is possible to shorten the processing time period from when the job of the Map Reduce is executed until when the job has been completed.

Furthermore, the management server 10 sequentially assigns keys having the greater number of processes to be performed in the ascending order of the Reduce IDs, whereas the master node 30 sequentially assigns Reduce tasks having the greater number of processes to be performed to Reduce slots. Consequently, the processing time can be shortened when compared with a case in which a Reduce task is assigned without taking into consideration the number of processes to be performed.

Figure 19:
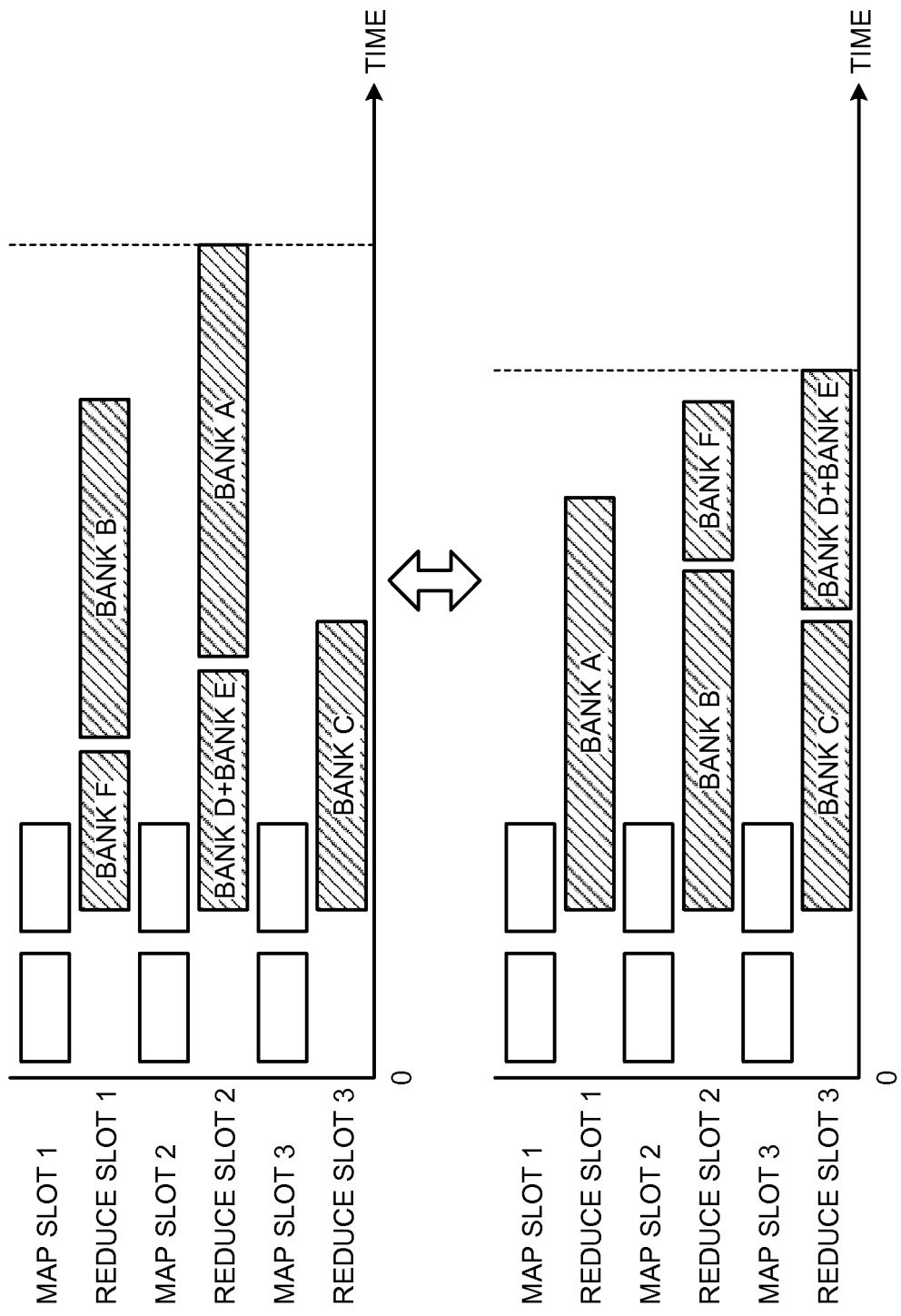
FIG. 19 is a schematic diagram illustrating a reduction example of the processing time taken to assign Reduce tasks.

FIG. 19 is a schematic diagram illustrating a reduction example of the processing time taken to assign Reduce tasks. In FIG. 19, a description will be given of an example in which five Reduce tasks including a spare Reduce task are assigned to three Reduce slots.

As illustrated in upper portion of FIG. 19, the example is a case of sequentially assigning, in the order of keys they appear less frequently, the bank F (10000 appearances), the bank D+the bank E (50000 appearances), the bank C (60000 appearances), the bank B (80000 appearances), and the bank A (100000 appearances). In this case, first, the bank F (10000 appearances), the bank D+the bank E (50000 appearances), and the bank C (60000 appearances) are sequentially assigned to the Reduce slots 1, 2, and 3, respectively, in this order.

Then, if the process performed on the bank F that has the smallest number of appearances has ended, the bank B (80000 appearances) is then assigned to the Reduce slot 1 that performed the process on the bank F. Furthermore, if the process performed on the bank D+the bank E that has the subsequently small number of appearances has ended, the bank A (100000 appearances) is then assigned to the Reduce slot 2 that performed the process on the bank D+the bank E. Accordingly, the completion time of the Reduce processes corresponds to the sum of the processing time of the bank D+the bank E (50000 appearances) and the processing time of the bank A (100000 appearances).

In contrast, in the lower portion of FIG. 19, the example is a case of sequentially assigning, in the order of keys they appear frequently, the bank A (100000 appearances), the bank B (80000 appearances), the bank C 60000 appearances), the bank D+the bank E (50000 appearances), and the bank F (10000 appearances). In this case, first, the bank A, the bank B, and the bank C are sequentially assigned to the Reduce slots 1, 2, and 3, respectively, in this order.

Then, if the process performed on the bank C that has the smallest number of appearances from among the assigned keys has ended, the bank D+the bank E are then assigned to the Reduce slot 3 that performed the process on the bank C. Furthermore, if the process performed on the bank B that has the subsequently small number of appearances has ended, the bank F is then assigned to the Reduce slot 2 that performed the process on the bank B. Accordingly, the completion time of the Reduce processes corresponds to the sum of the processing time of the bank C (60000 appearances) and the processing time of the bank D+the bank E (50000 appearances).

When the upper portion of FIG. 19 is compared with the lower portion thereof, in the upper portion, the processing time for 150000 appearances is needed and, in the lower portion, the processing time for 110000 appearances is needed. Namely, it is possible to shorten the overall processing time by sequentially assigning Reduce tasks to the keys in the order they have large number of appearances.

Furthermore, MapReduce has a characteristic in which data transfer to a Reduce task that is performed during the background process on a Map task is hidden by the execution time of the Map task. By assigning, using this characteristic, a Reduce task first in which the number of appearances of a key is great, it is possible to minimize the hiding of the time taken to perform the data transfer (Shuffle process) from the Map task to the Reduce task.

Figure 20:
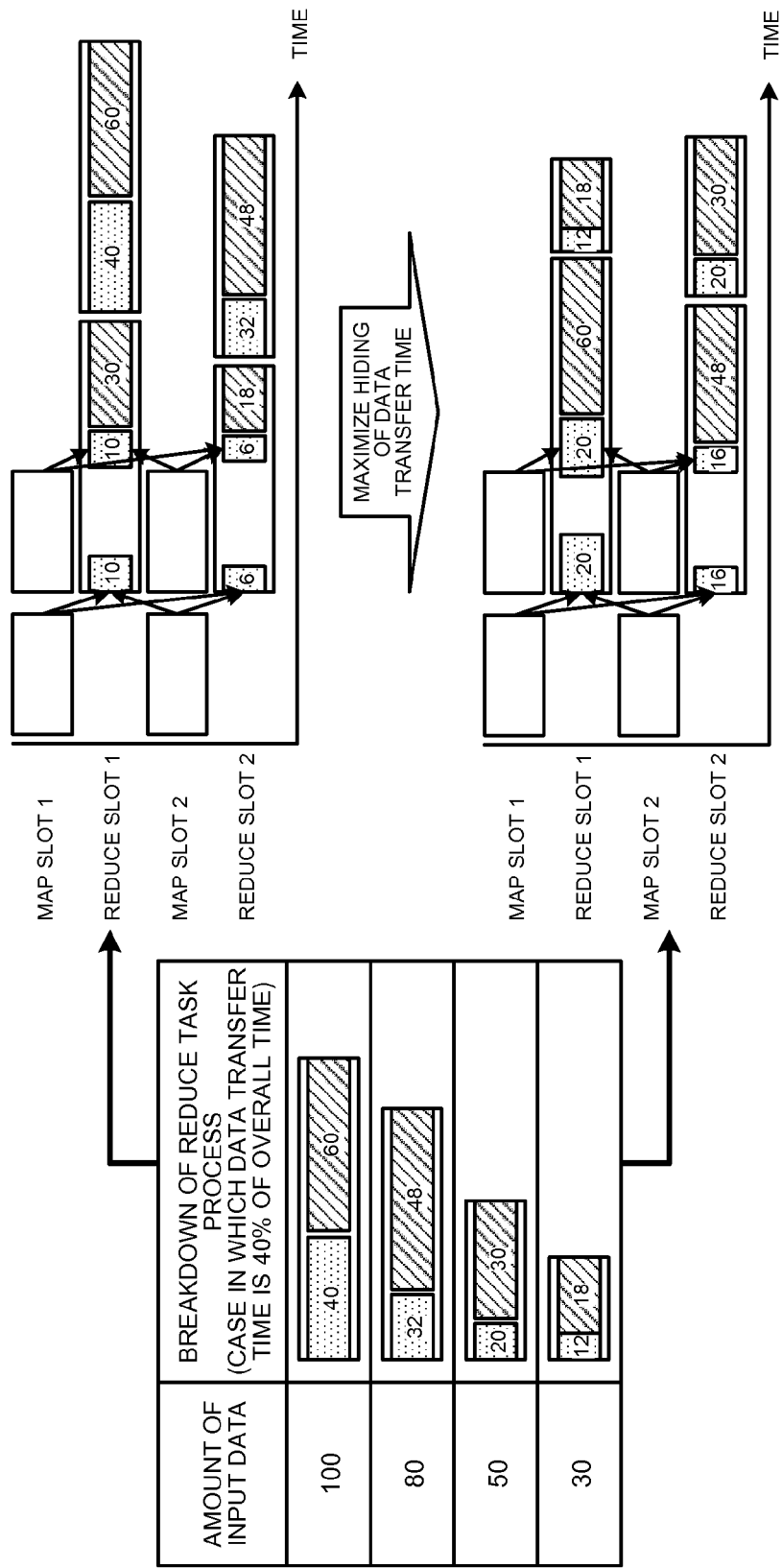
FIG. 20 is a schematic diagram illustrating a reduction example of data transfer of the Reduce tasks.

FIG. 20 is a schematic diagram illustrating a reduction example of data transfer of the Reduce tasks. In FIG. 20, a description will be given of an example in which four Reduce tasks including a spare Reduce task are assigned to two Reduce slots. Furthermore, in FIG. 20, it is assumed that the data transfer time is 40% of the appearances. Namely, it is assumed that, if an amount of input data is set to 100, 40 corresponds to the data transfer time and 60 corresponds to the actual processing time. Furthermore, it is assumed that the processing time of the Map tasks are the same.

The upper portion of FIG. 20 illustrates a case in which assignment is sequentially performed on keys in the order they appear less frequently and, specifically, a case in which the amounts of input data (30) and (50) are assigned first and then the amounts of input data (80) and (100) are assigned. In this case, it is possible to perform 10 data transfer out of the amount of data (50) and perform six data transfer out of the amount of data (30) during the execution of the Map tasks. Namely, a total of 16 data transfer can be performed during the execution of the Map tasks.

In contrast, the lower portion of FIG. 20 illustrates a case in which the assignment is sequentially performed on keys in the order they appear frequently and, specifically, a case in which the amounts of input data (100) and data (80) are assigned first and then the amounts of input data (50) and (30) are assigned. In this case, it is possible to perform 20 data transfer out of the amount of data (100) and perform 16 data transfer out of the amount of data (80) during the execution of the Map tasks. Namely, a total of 36 data transfer can be performed during the execution of the Map tasks.

Consequently, because it is possible to transfer the greater number of pieces of Reduce data targeted for the Reduce processes during the execution of the Map tasks when assignment is sequentially performed on the keys in the order they appear frequently, the processing time taken to prepare the Reduce tasks can be shortened. Thus, it is possible to shorten the overall processing time.

Furthermore, the effect of this scheduling also leads to improvement of the effect of a spare Reduce task. Because a key that is understood that the number of appearances is small among the pieces of input data is assigned or because a key with a small number of appearances, such as a key that is not detected at the sampling, is assigned to a spare Reduce task, the execution time thereof is small. In order to efficiently perform equalization by using this short execution time, the difference between the end time of the Reduce slots is preferably small. Accordingly, as is understood from the comparison between the upper portion and the lower portion of FIG. 20, because the difference between the end time of the Reduce slots is smaller when a Reduce task that has a greater number of pieces of input data is assigned with priority, the effect of the spare Reduce task becomes high.

[b] Second Embodiment

In the above explanation, a description has been given of the embodiment according to the present invention; however, the present invention may also be implemented with various kinds of embodiments other than the embodiment described above. Therefore, another embodiment will be described below.

Number of Spare Reduce Tasks

In the embodiment described above, a description has been given of a case in which a single spare Reduce task is included; however, the present invention is not limited thereto and a plurality of spare Reduce tasks may also be included. In such a case, by calculating hash values by using the number of spare Reduce tasks, each of the slave nodes 50 can assign Reduce IDs commonly used in the system.

Assignment to a Spare Reduce Task

Furthermore, in the above example, a description has been given of an example in which the main key that is not included at the time of sampling is assigned to a spare Reduce task; however, the embodiment is only an example and does not limit the assignment. For example, there may be a case in which, depending on the calculated rate, the main key that is not assigned to a normal Reduce task and that appears less frequently is assigned to a spare Reduce task. Furthermore, the number of main keys assigned to a spare Reduce task is not limited to one. For example, there may be a case in which two or more main keys are assigned.

Amount of Input Data to be Assigned

In the embodiment described above, a description has been given of an example in which the amount of input data to be assigned to the spare Reduce task is the smallest among the Reduce tasks. For the amount of input data mentioned here, for example, the number of records, the magnitude of payload, or the like can be arbitrarily specified. A small amount of input data can be determined on the basis that, for example, number of records is small, the magnitude of payload is small, or the like.

System

Of the processes described in the embodiment, the whole or a part of the processes that are mentioned as being automatically performed can also be manually performed, or the whole or a part of the processes that are mentioned as being manually performed can also be automatically performed using known methods. Furthermore, the flow of the processes, the control procedures, the specific names, and the information containing various kinds of data or parameters indicated in the above specification and drawings can be arbitrarily changed unless otherwise stated.

Furthermore, the components of each unit illustrated in the drawings are only for conceptually illustrating the functions thereof and are not always physically configured as illustrated in the drawings. In other words, the specific shape of a separate or integrated device is not limited to the drawings. Specifically, all or part of the device can be configured by functionally or physically separating or integrating any of the units depending on various loads or use conditions. Furthermore, all or any part of the processing functions performed by each device can be implemented by a CPU and by programs analyzed and executed by the CPU or implemented as hardware by wired logic.

Hardware

Figure 21:
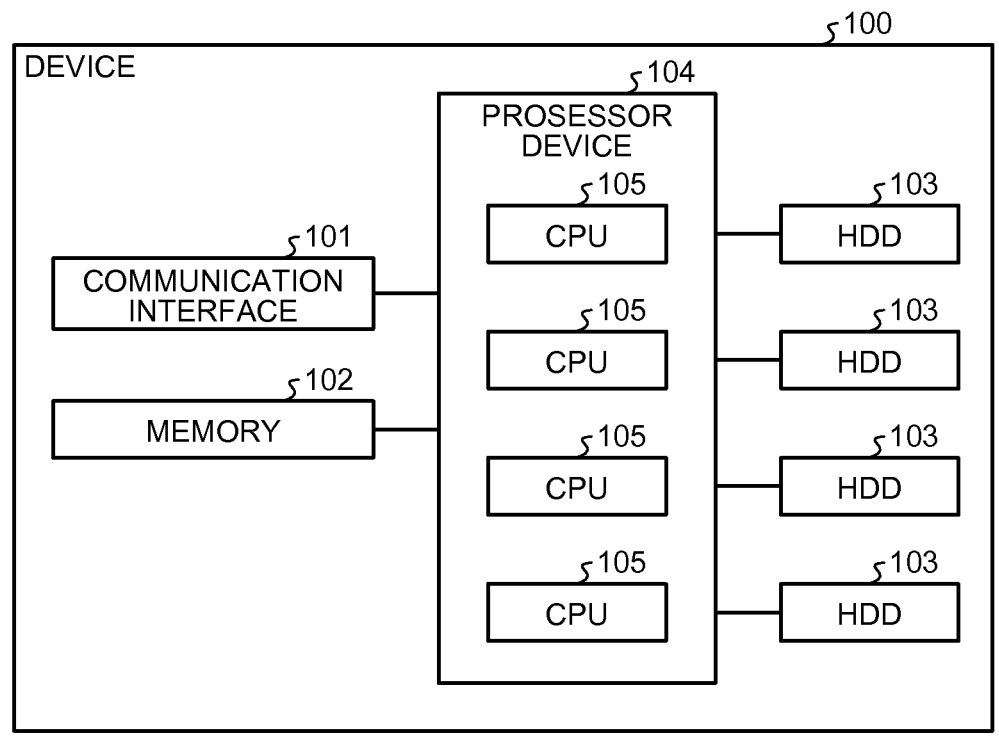
FIG. 21 is a block diagram illustrating an example of the hardware configuration of a device.

In the following, an example of the hardware configuration of each of the servers will be described. However, each of the servers has the same configuration; therefore, only an example will be described here. FIG. 21 is a block diagram illustrating an example of the hardware configuration of a device. As illustrated in FIG. 21, a device 100 includes a communication interface 101, a memory 102, a plurality of hard disk drives (HDDs) 103, and a processor device 104.

The communication interface 101 corresponds to the communication control unit indicated when each of the functioning units are described and is, for example, a network interface card or the like. The plurality of HDDs 103 each store therein programs that operates the processing units indicated when each of the functioning units has been described above, the DBs, or the like.

A plurality of CPUs 105 included in the processor device 104 reads, from the HDDs 103 or the like, programs that execute the same processes as that performed by each of the processing units indicated when each of the functioning units has been described above and then loads the programs in the memory 102, thereby the programs operate the processes that execute the functions described with reference to FIGS. 6, 9, and 12, or the like. Namely, the processes execute the same functions as those performed by the sampling execution unit 16, the execution count acquiring unit 17, the rate deciding unit 18, the task deciding unit 19, and the table distributing unit 20 included in the management server 10. Furthermore, the processes execute the same functions as those performed by the distributing unit 41, the Map assigning unit 42, and the Reduce assigning unit 43 included in the master node 30. Furthermore, the processes execute the same function as those performed by the acquiring unit 61, the Map processing unit 62, and the Reduce processing unit 63 included in the slave node 5.

In this way, by reading and executing the program, the device 100 operates as an information processing apparatus that executes a data processing control method or a task execution method. Furthermore, the device 100 reads the programs described above from a recording medium by using a media reader and executes the read programs, thereby implementing the same functions as those performed in the embodiment described above. The programs mentioned in the other embodiment are not limited to be executed by the device 100. For example, the present invention may also be similarly used in a case in which another computer or a server executes the program or in which another computer and a server cooperatively execute the program with each other.

According to an aspect of an embodiment, the processing time can be shortened.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A data processing control method comprising:
first assigning, by a processor device of a server, when assigning input data to normal Reduce tasks and a spare Reduce task that are performed by using results of Map processes in a MapReduce process, input data with a smaller amount than any of amounts of the input data which is assigned to the normal Reduce tasks to the spare Reduce task; and
second assigning, by the processor device of the server, the normal Reduce tasks and the spare Reduce task, to which the input data is assigned, to a server that performs Reduce processes in the MapReduce process such that the spare Reduce task is started after the assignment of all of the normal Reduce tasks.

2. The data processing control method according to claim 1, wherein the first assigning includes assigning, to the spare Reduce task, input data related to a key that is not included in an assignment rule that is used to assign the input data.

3. The data processing control method according to claim 1, wherein the first assigning includes assigning, to the spare Reduce task when an assignment rule that is used to assign the input data is performed on the basis of previously acquired information related to an amount of input data for each key, input data related to a key with a smallest amount of input data in the previously acquired information.

4. The data processing control method according to claim 3, wherein the second assigning includes setting attributes of the normal Reduce tasks and the spare Reduce task such that the normal Reduce tasks and the spare Reduce task are performed in descending order of amount of input data in the previously acquired information.

5. A non-transitory computer-readable recording medium having stored therein a data processing control program that causes a computer to execute a MapReduce process comprising:
assigning, when assigning input data to normal Reduce tasks and a spare Reduce task that are performed by using results of Map processes in a MapReduce process, input data with a smaller amount than any of amounts of the input data which is assigned to the normal Reduce tasks to the spare Reduce task; and
assigning the normal Reduce tasks and the spare Reduce task, to which the input data is assigned, to a server that performs Reduce processes in the MapReduce process such that the spare Reduce task is started after the assignment of all of the normal Reduce tasks.

6. A data processing control device comprising:
a memory; and
a processor that is connected to the memory, wherein the processor is configured to execute a process including:
assigning, when assigning input data to normal Reduce tasks and a spare Reduce task that are performed by using results of Map processes in a MapReduce process, input data with a smaller amount than any of amounts of the input data which is assigned to the normal Reduce tasks to the spare Reduce task; and
assigning the normal Reduce tasks and the spare Reduce task, to which the input data is assigned by the first assigning unit, to a server that performs Reduce processes in the MapReduce process such that the spare Reduce task is started after the assignment of all of the normal Reduce tasks.

* * * * *